(12) United States Patent
Yanai

(10) Patent No.: US 6,760,069 B2
(45) Date of Patent: Jul. 6, 2004

(54) METHOD AND APPARATUS FOR PROCESSING IMAGE SIGNALS

(75) Inventor: Toshikazu Yanai, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/184,639

(22) Filed: Nov. 3, 1998

(65) Prior Publication Data

US 2003/0156209 A1 Aug. 21, 2003

(30) Foreign Application Priority Data

Nov. 5, 1997 (JP) .............................. 9-302868

(51) Int. Cl.$^7$ ......................... H04N 3/14; H04N 5/335; H04N 9/04; H04N 9/083
(52) U.S. Cl. ..................... 348/273; 348/222.1
(58) Field of Search .................. 348/222, 272, 348/273, 279, 716.1, 222.1

(56) References Cited

U.S. PATENT DOCUMENTS

| | | | | |
|---|---|---|---|---|
| 5,121,193 A | * | 6/1992 | Nishimura et al. | 348/279 |
| 5,262,871 A | * | 11/1993 | Wilder et al. | 348/307 |
| 5,457,494 A | * | 10/1995 | Suga et al. | 348/229 |
| 5,508,742 A | * | 4/1996 | Geerlings et al. | 348/279 |
| 5,568,193 A | * | 10/1996 | Kawahara | 348/222.1 |
| 5,648,817 A | * | 7/1997 | Aoki et al. | 348/262 |
| 5,872,596 A | | 2/1999 | Yanai et al. | 348/297 |
| 5,880,781 A | * | 3/1999 | Udagawa et al. | 348/279 |
| 5,905,528 A | * | 5/1999 | Kodama | 348/220.1 |
| 6,124,888 A | * | 9/2000 | Terada et al. | 348/302 |

* cited by examiner

Primary Examiner—Andrew Christensen
Assistant Examiner—Eric Wisdahl
(74) Attorney, Agent, or Firm—Fitzpatrick, Cella, Harper & Scinto

(57) ABSTRACT

Charges in the pixels of a solid state image pickup device, which senses an object via a color filter, are processed by: first selecting a group of pixels in two horizontal lines from a group of at least three lines; adding together the charges in those corresponding pixels of the two horizontal lines which are diagonally adjacent to each other;

and adding together the charges in those corresponding pixels of the two horizontal lines which are vertically adjacent to each other.

8 Claims, 40 Drawing Sheets

FIG. 4

| | 1ST COLUMN | 2ND COLUMN | 3RD COLUMN | 4TH COLUMN |
|---|---|---|---|---|
| 10TH ROW | G | Mg | G | Mg |
| 9TH ROW | Ye | Cy | Ye | Cy |
| 8TH ROW | G | Mg | G | Mg |
| 7TH ROW | Ye | Cy | Ye | Cy |
| 6TH ROW | G | Mg | G | Mg |
| 5TH ROW | Ye | Cy | Ye | Cy |
| 4TH ROW | G | Mg | G | Mg |
| 3RD ROW | Ye | Cy | Ye | Cy |
| 2ND ROW | G | Mg | G | Mg |
| 1ST ROW | Ye | Cy | Ye | Cy |

FIG. 40

METHOD AND APPARATUS FOR PROCESSING IMAGE SIGNALS

BACKGROUND OF THE INVENTION

1. Field of the Invention

This invention relates to solid state image sensing and display devices of the type used, for example, in high resolution electronic still cameras, electronic viewfinders and liquid crystal displays, and to the processing of signals in such devices.

2. Description of the Related Art

Referring first to FIG. 1, which is a schematic diagram illustrating a known interline type solid state image sensing device, there is provided an array of photoelectric conversion pixels 1 arranged in vertical columns and horizontal rows or lines. Vertical charge transfer units 2 are arranged in each column; and a horizontal charge transfer unit 3 is arranged below the columns. An output unit 4 is connected to receive charge outputs from the horizontal charge transfer unit 3 and to convert those charges to electrical signals which are output via an output terminal 5.

Signal charges are produced by the respective pixels 1 by means of photoelectric conversion. These charges are sent to the vertical charge transfer units 2 which, under the control of four-phase driving pulses $\phi V1$, $\phi V2$, $\phi V3$ and $\phi V4$, transfers them toward the horizontal charge transfer unit 3. Then the charge transfer unit 3, under the control of two-phase driving pulses $\phi H1$ and $\phi H2$, transfers these charges, on a line-by-line basis, to the output unit 4. The output unit 4 converts the charges to electrical signals which it outputs at the signal output terminal 5.

FIG. 2 is block diagram which illustrates a solid state image pickup apparatus. This apparatus includes an image sensing device 7 which is connected to be driven by a driving circuit 8. The image sensing device 7, converts light images to electrical charges by photoelectric conversion; and, in response to drive inputs from the driving circuit 8, transfers those charges to a signal processing circuit 9. The signal processing circuit 9 in turn is connected to supply processed signals to an image memory 12 which stores signals corresponding to the charges formed on each pixel of the image sensing device 7 in one frame of a sensed image. These stored image signals are then transferred from the memory 8 to an image display device 10. The image display device 10 also has pixels arranged in columns and rows or 2 lines; and these pixels convert the received electrical signals to light images.

The operations of the image sensing device driver 8, the signal processing device 9, the image memory 12 and the image display device 10 are coordinated by means of a synchronization device 11.

The image display device 10 has a smaller number of pixels in each vertical column than the number of pixels in the corresponding vertical columns of the image sensing device 7.

The display device 10 in a conventional solid-state image pickup apparatus, such as that shown in FIG. 2, may have a smaller number of pixels in its vertical columns than the number of pixels in the corresponding vertical columns of the image sensing device 7. In this case, the signal outputs of all the pixels of the image sensing device 7's vertical columns are stored in the image memory 12; but when these signals are transferred to the image display device 10, they are supplied in such a manner that the signals corresponding to particular horizontal lines are omitted. This has the effect of reducing the number of pixels down to a value equal to the number of pixels in the image display device 10.

Such conventional solid state image pickup apparatuses, whose image display device has a smaller number of pixels in its 3 vertical columns than the number of pixels in the corresponding vertical columns of the associated image display device, the image sensing device always outputs a signal which includes all pixels in each image sensing operation. Since not all these pixels are used for the display, a longer than necessary amount of time is used in each image sensing operation. Furthermore, in cases where images are displayed sequentially, the next image cannot be updated in a sufficiently short time because of the long processing time required to write an image signal into the image memory and thereafter to read it out of the memory. This makes it difficult for a user to determine the composition of a picture.

Also, in order to reduce the number of pixels from the vertical rows of the stored image to that of the image display device, additional components, such as a special image memory and vertical signal reduction circuits are required. This causes an increase in the complexity of the circuits and an increase in production costs.

SUMMARY OF THE INVENTION

It is an object of the present invention to provide an improved method of, and apparatus for, reading pixel signals from a solid state image sensing device.

It is another object of the present invention to provide an improved method of, and apparatus for, reading pixel signals from a solid state image sensing device having a larger number of pixels in each vertical column; and applying the read signals to a display device having a smaller number of pixels in each vertical column.

It is still another object of the present invention to provide a method of, and apparatus for, reading an image signal from a solid state image sensing device so that the obtained signal has a high quality even when the image sensing device operates under darkened conditions.

According to one aspect of the invention, signals in an image pickup device having pixels arranged in vertical columns and horizontal lines are processed by reading signals from pixels in each of two lines in a group of n horizontal lines, where n is an integer equal to or greater than 3, adding together the signals of diagonally adjacent 2 k pixels, wherein k is an integer equal to or greater than 1, and also adding together the signals of vertically adjacent 2 k pixels.

According to another aspect of the invention, there is provided a novel image pickup apparatus having pixels arranged in vertical columns and horizontal lines. Control means are provided to read signals from pixels in each of two horizontal lines which are separated by at least two intermediate horizontal lines, then to add to each of a group of pixel signals read from one of the two horizontal lines with pixel signals that have been read from corresponding diagonally offset pixels in the other of the two horizontal lines, and to add each of a group of read pixel signals from the one horizontal line with signals that are read from corresponding, vertically adjacent, pixels in the other of the two horizontal lines.

According to a further aspect of the present invention there is provided a novel image pickup apparatus which comprises a solid state image sensing device having pixels arranged in vertical columns and horizontal lines, and an image display device which also has pixels arranged in vertical columns and horizontal lines, the number of pixels in the vertical columns of the image display device being less than the number of pixels in the vertical columns of the image sensing device. A control means is provided for controlling the image sensing device so that it outputs signals from pixels which are located in less than all of its horizontal lines. A signal processing circuit is also provided for applying the output signals from the image sensing device to the image display device.

These and other objects, features and advantages will become apparent from the following detailed description in conjunction with the accompanying drawings.

BRIEF DESCRIPTION OF THE DRAWINGS

FIG. 4 is a schematic diagram illustrating a color filter array which is associated with the sensing device of FIG. 3;

FIG. 40 is a schematic diagram illustrating the solid state image sensing device according to the third embodiment of the invention.

DESCRIPTION OF THE PREFERRED EMBODIMENT

The present invention is described in further detail below with reference to preferred embodiments in conjunction with the accompanying drawings.

First Embodiment

Figure 3:
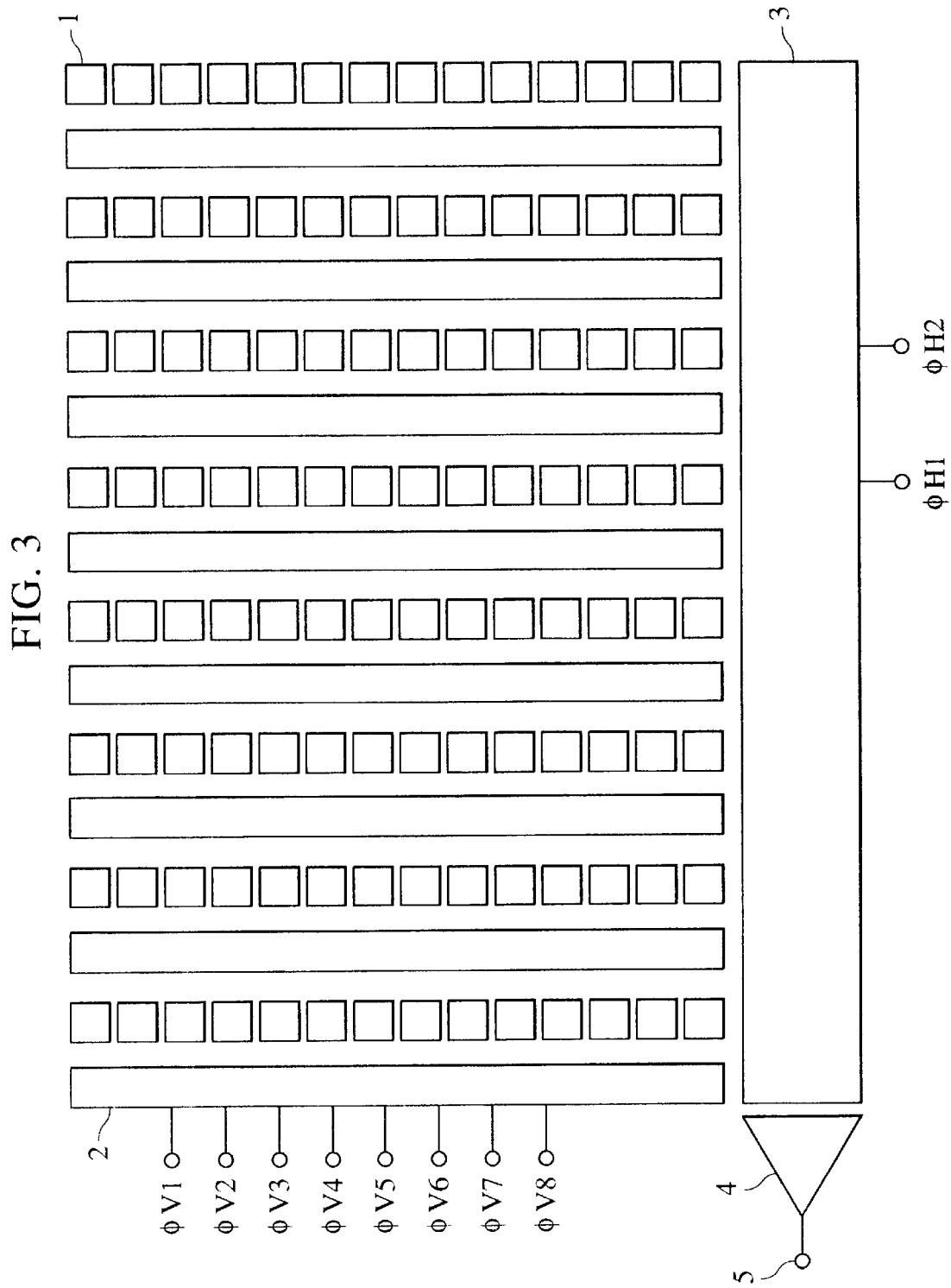
FIG. 3 is a schematic diagram illustrating the general layout of a solid state image sensing device according to a first or a second embodiment of the invention.

A first embodiment is described below with reference to FIGS. 3 to 19. FIG. 3 is a schematic diagram illustrating the general structure of an interline type solid state image sensing device according to the first embodiment of the invention. In FIG. 3, reference numeral 1 denotes a pixel, 2 denotes a vertical charge transfer unit, 3 denotes a horizontal charge transfer unit, 4 denotes an output unit, and 5 denotes a signal output terminal. Signal charges produced by the respective pixels by means of photoelectric conversion are transferred to the vertical charge transfer unit 2 in synchronization with reading pulses and then further transferred sequentially toward the horizontal charge transfer unit 3 in synchronization with eight-phase driving pulses $\phi V1$, $\phi V2$, $\phi V3$, $\phi V4$, $\phi V5$, $\phi V6$, $\phi V7$, and $\phi V8$ applied to electrodes V1, V2, V3, V4, V5, V6, V7, and V8, respectively. The horizontal charge transfer unit 3 transfers the one-line signal charges received from the vertical charge transfer unit 2 to the output unit 4 in synchronization with two-phase driving pulses applied to electrodes H1 and H2. The output unit creates a voltage signal according to the signal charges and outputs the resultant voltage signal via the signal output terminal 5. In this particular embodiment, vertical charge transfer unit 2 is constructed such that each pixel is driven by two electrodes, that is, each group consisting of four pixels is driven by eight-phase pulses applied to eight electrodes. In this construction, pulses are applied to electrodes V1, V3, V5, and V7 serving as vertical charge transfer electrodes and also as reading electrodes so that the signal charges generated by the respective pixels are read and sent, in response to theses pulses, to the vertical charge transfer unit 2.

FIG. 4 illustrates a part of a color filter array used in the preset embodiment. In this particular example, yellow (Ye) is employed as a first color, cyan (Cy) as a second color, magenta (Mg) as a third color, and green (G) as a fourth color.

Figure 5:
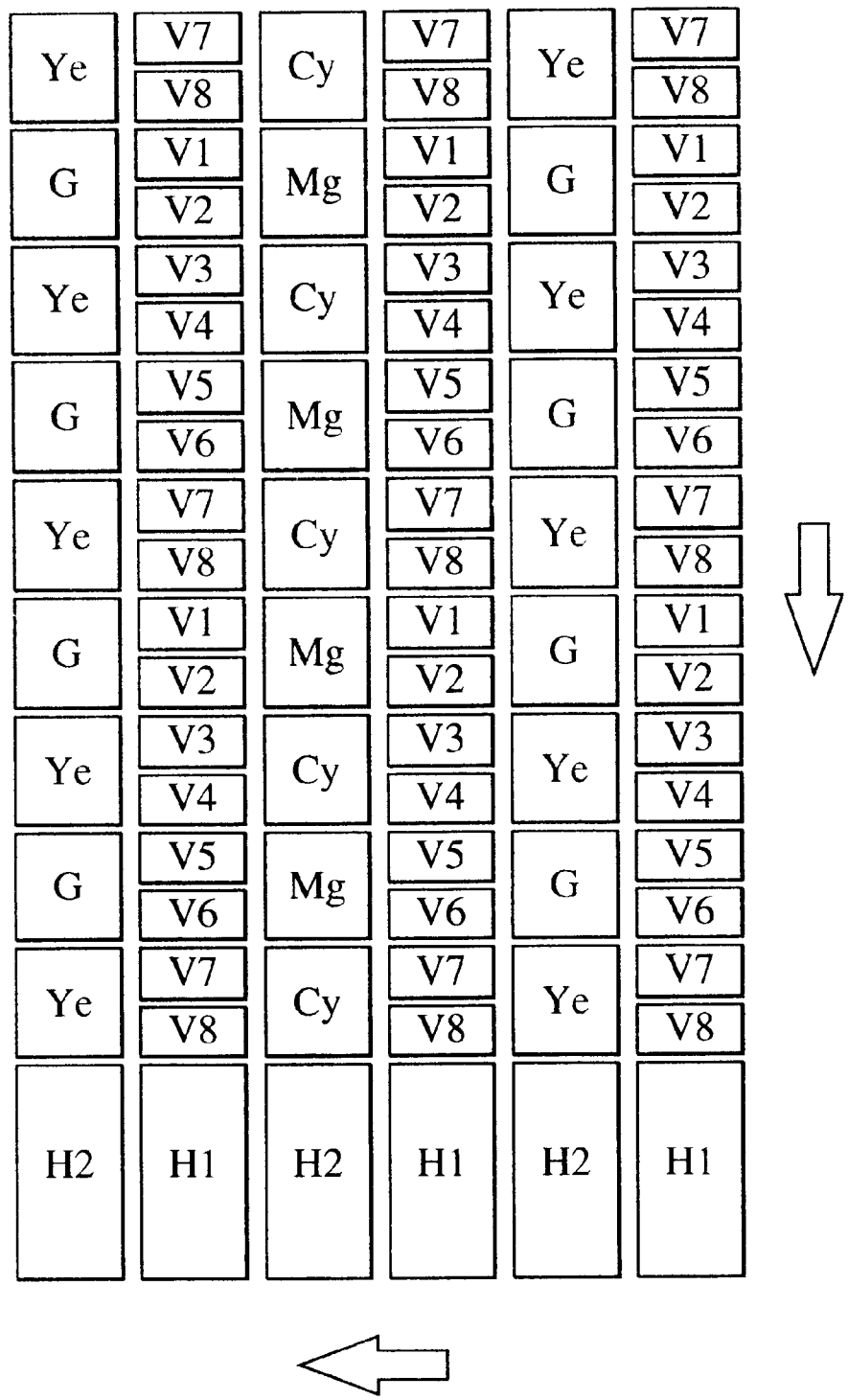
FIG. 5 is a schematic diagram illustrating a layout of a solid state image sensing device according to a first or a second embodiment of the invention.

FIG. 5 is a schematic diagram illustrating the solid state image sensing device according to the present embodiment wherein the respective pixels 1 are covered with elements of the color filter array shown in FIG. 4. The vertical charge transfer unit 2 includes transfer electrodes denoted by V1, V2, V3, V4, V5, V6, V7, and V8 to which eight-phase driving pulses $\phi V1$, $\phi V2$, $\phi V3$, $\phi V4$, $\phi V5$, $\phi V6$, $\phi V7$, and $\phi V8$ are applied respectively. The horizontal charge transfer unit 3 includes transfer electrodes denoted by H1 and H2 to which two-phase driving pulses $\phi H1$ and $\phi H2$ are applied respectively. The vertical charge transfer unit 2 transfers signal charges downward in FIG. 5 and horizontal charge transfer unit 3 transfers signal charges in a horizontal direction in FIG. 5.

Referring now to FIGS. 6–18, the operation of reading the signal charges accumulated in the respective pixels 1 covered with the corresponding color filters is described below. In this specific example, n is set to 4 and pixel signals are read for particular two lines of every four lines and output after adding the two-line pixel signals into one-line pixel signal. Herein the term "line" is used to represent a horizontal line, "one-line pixel signal" refers to a pixel signal along one horizontal line, and so on.

Furthermore, in this particular example, color filters, vertical transfer electrodes, and horizontal transfer electrodes are disposed as shown in FIG. 5. In the present embodiment, the reading operation is performed such that pixel signals are read along the third and fourth lines of every four lines and thus these lines are represented by (4 m+3)th and (4 m+4)th lines where m is an integer equal to or greater than 0.

Figure 6:
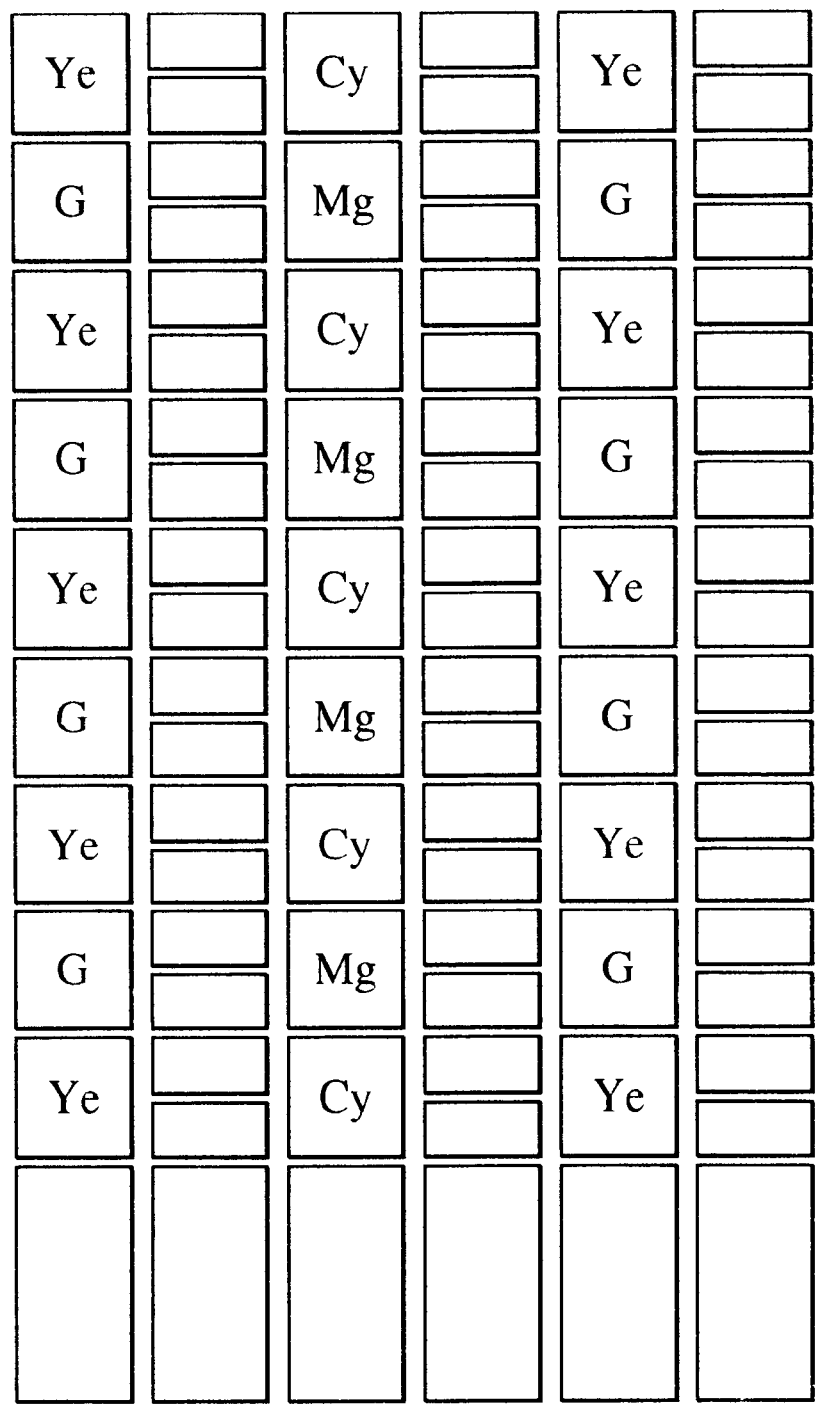
FIGS. 6–18 are schematic diagrams similar to FIG. 5 but illustrating different stages in a reading operation of a solid state image sensing device according to the first or a third embodiment of the invention.
Figure 7:
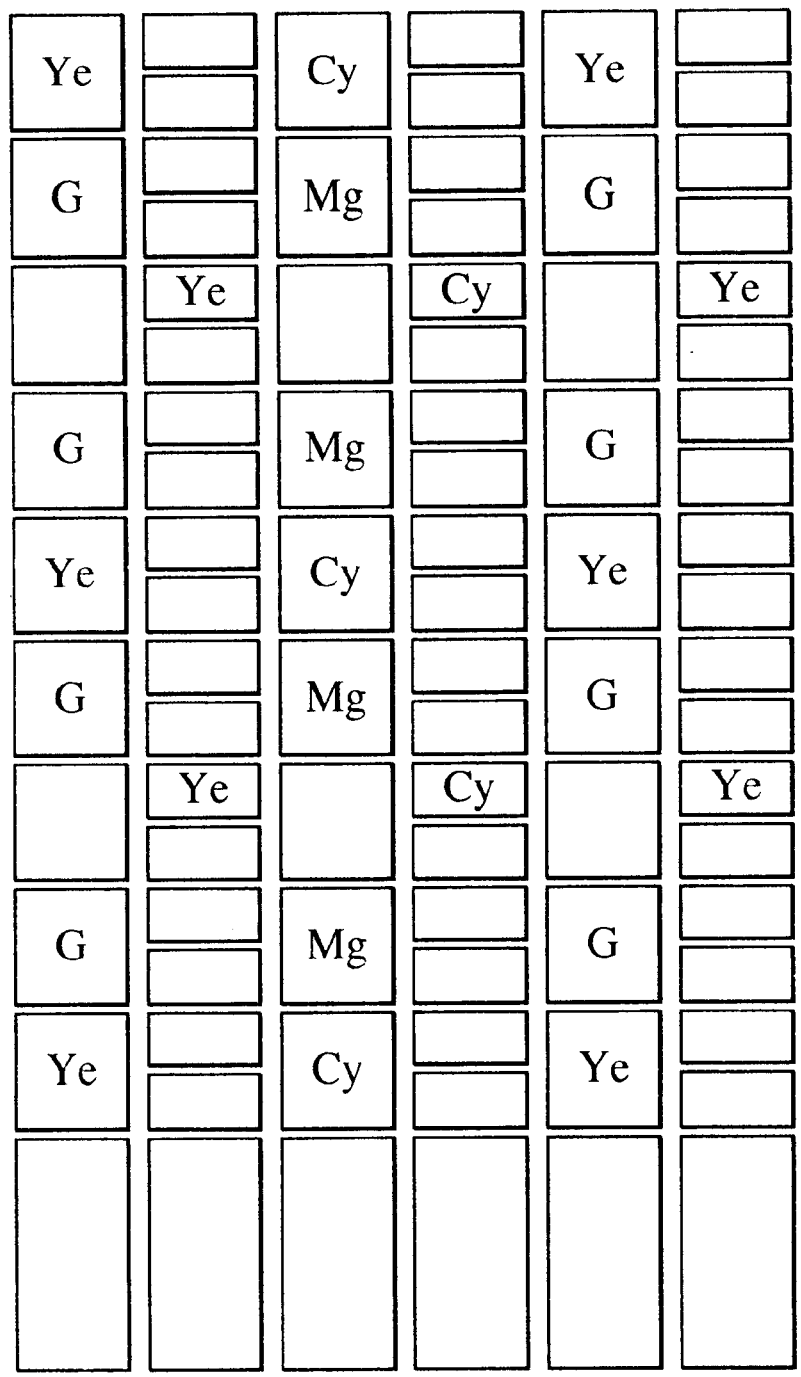
Figure 8:
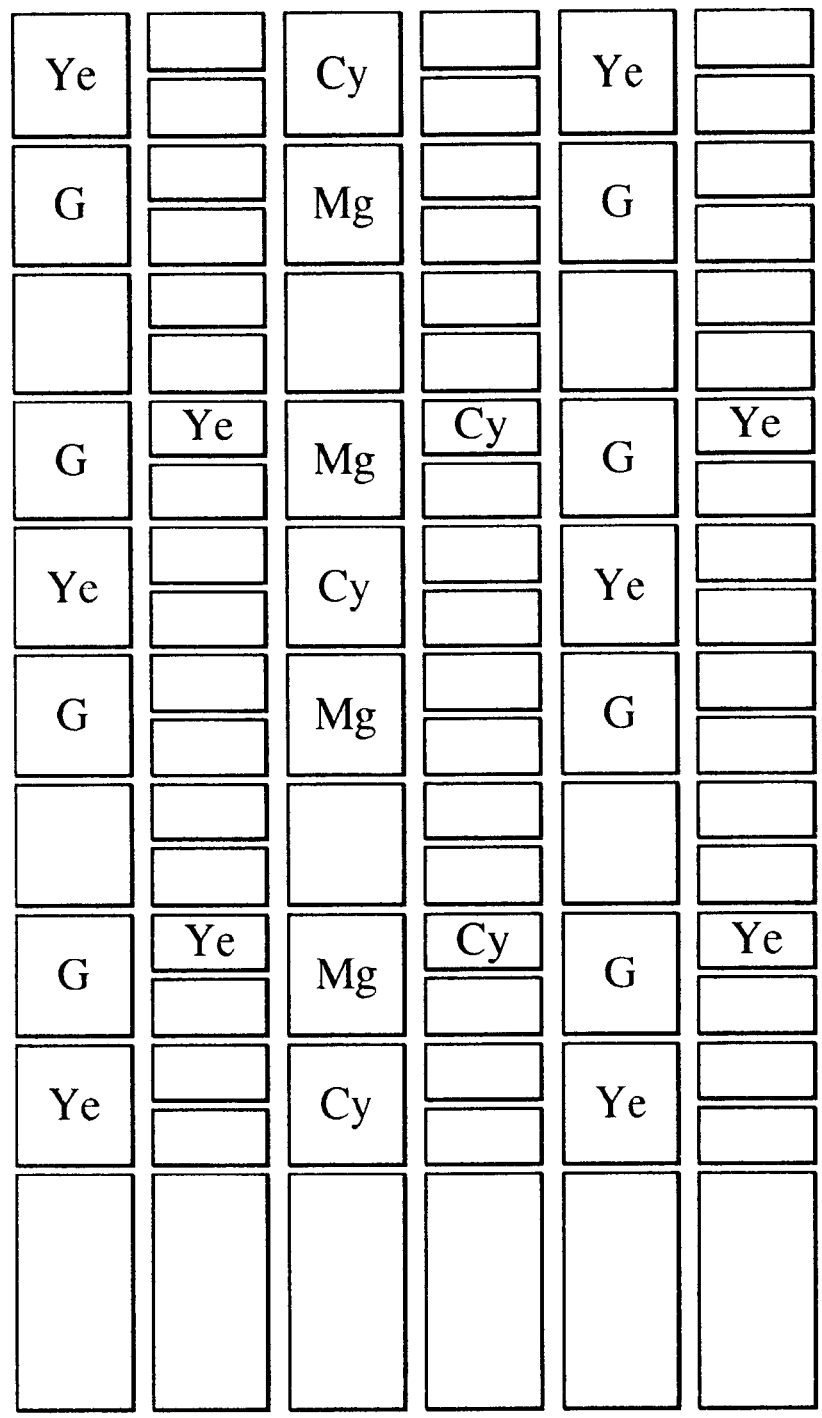
Figure 9:
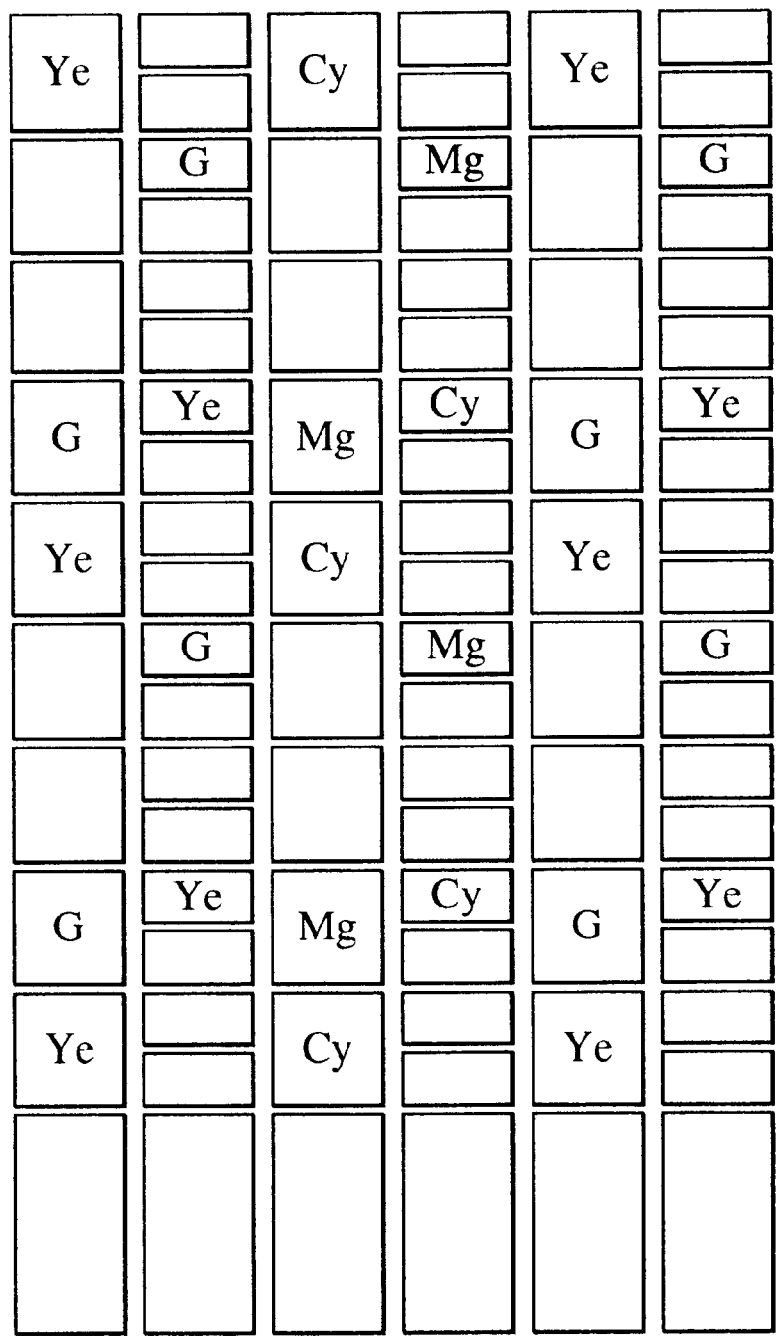
Figure 10:
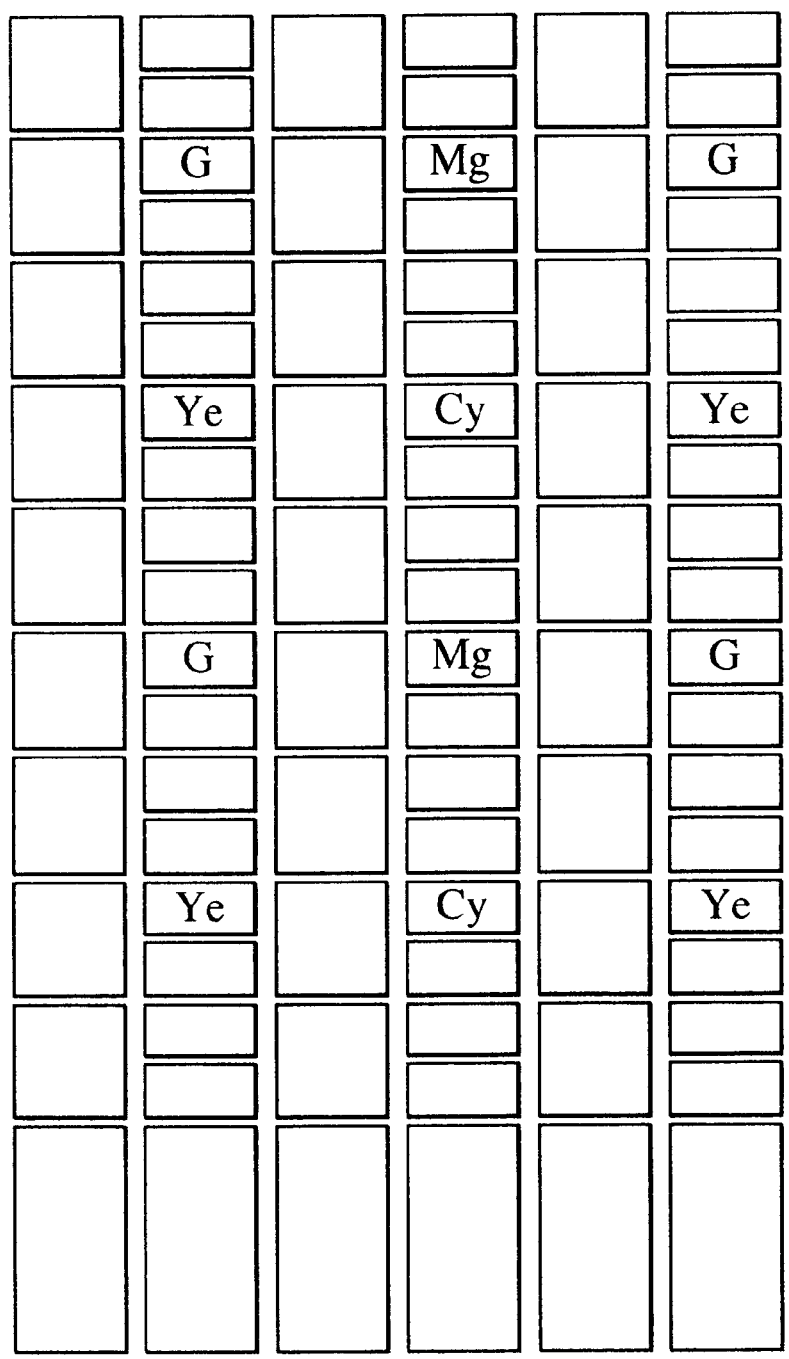

FIG. 6 illustrates the state in which accumulated signal charges are stored in the respective pixels 1 having their own color filter. First, as shown in FIG. 7, a reading pulse is applied to V3 of the vertical transfer electrodes so that Ye and Cy signal charges on the (4 m+3)th lines are read into the corresponding vertical transfer electrodes V3 and transferred to the vertical transfer electrodes V5 as shown in FIG. 8. A reading pulse is then applied to V1 of the vertical transfer electrodes so that G and Mg signal charges on the (4 m+4)th lines are read into the corresponding vertical transfer electrodes V1, as shown in FIG. 9. After that, signal charges on the (4 m+1)th and (4 m+2)th lines which were not read out in the above process are swept out as shown in FIG. 10. The sweeping may be performed for example into a substrate. Upon completion of the sweeping operation, the pixels 1 start to accumulate signal charges via photoelectric conversion although the detailed description is not given here.

Figure 11:
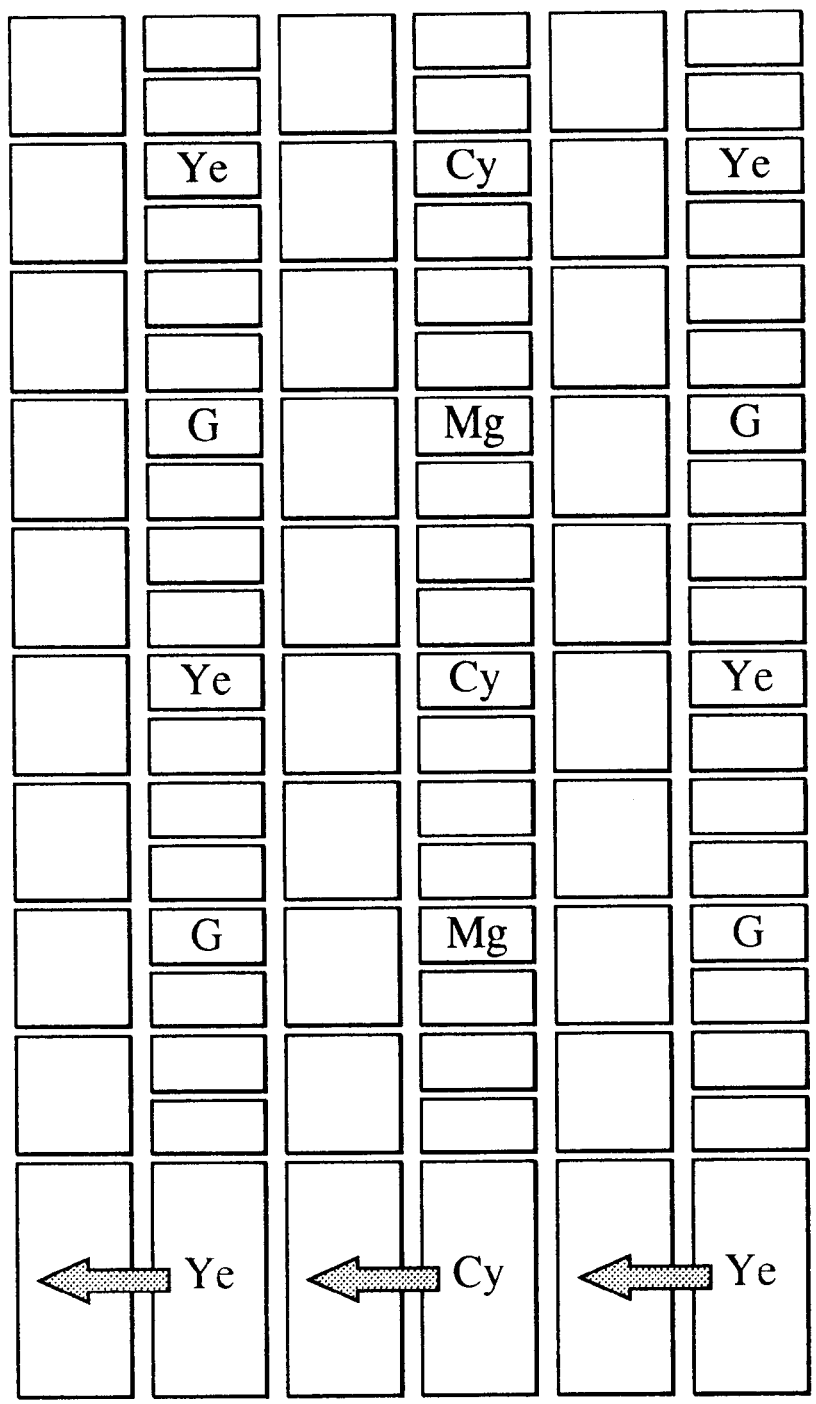
Figure 12:
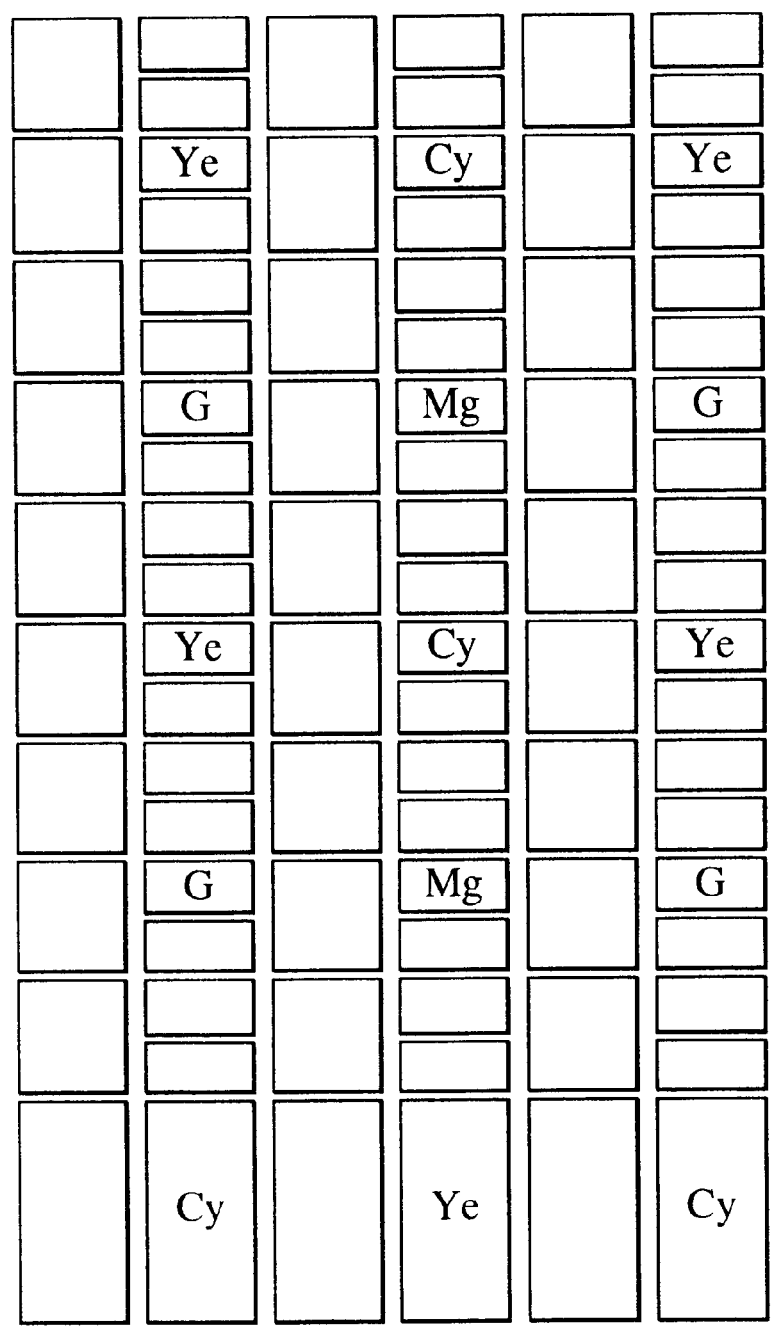
Figure 13:
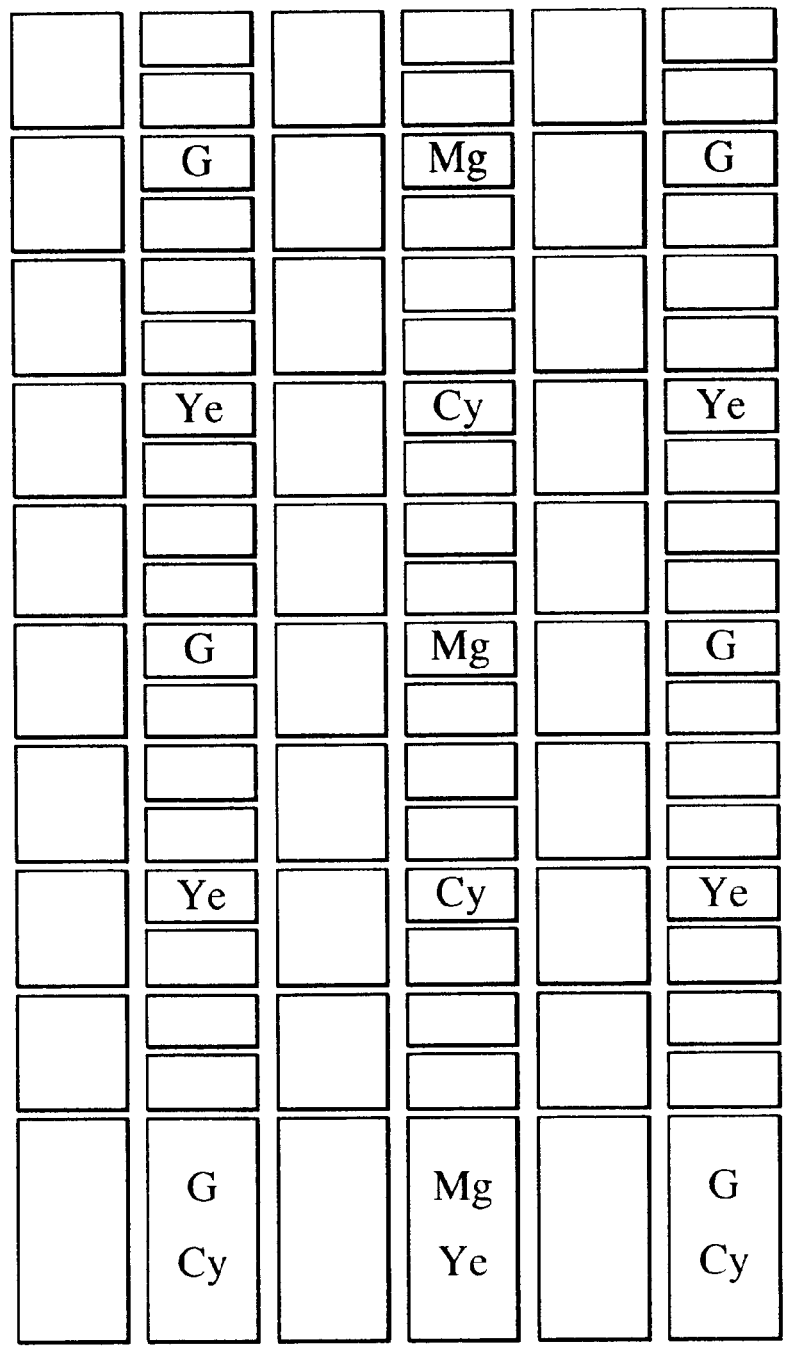
Figure 14:
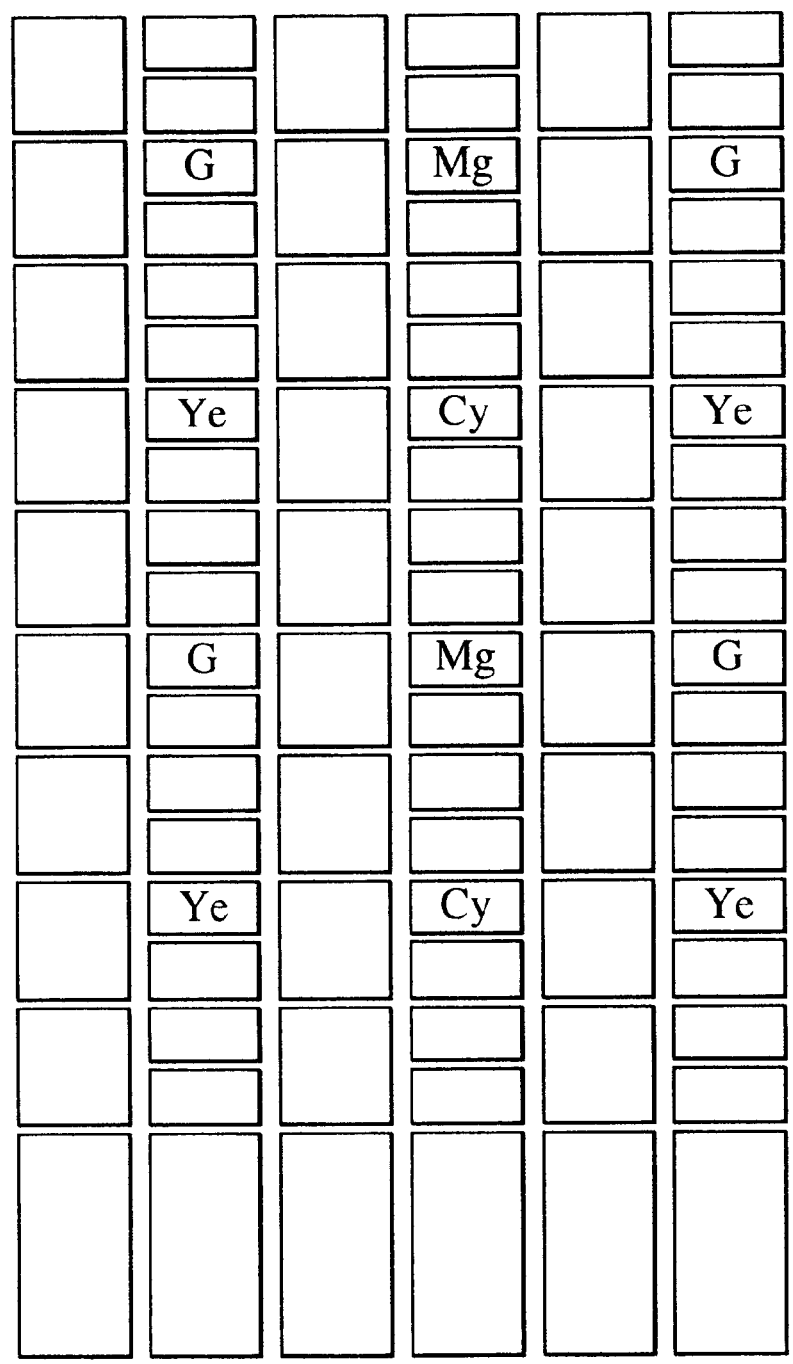

Then, as shown in FIG. 11, the signal charges are transferred in the vertical direction by an amount corresponding to two pixels or four electrodes thereby transferring the Ye and Cy signal charges to the horizontal charge transfer unit 3. The signal charges are then transferred in the horizontal direction by an amount corresponding to one pixel so that the signal charges are now located in the order Cy and Ye as shown in FIG. 12. After that, as shown in FIG. 13, the signal charges are transferred in the vertical direction by an amount corresponding to two pixels or four electrodes thereby transferring the G and Mg signal charges to the horizontal charge transfer unit 3. As a result, Cy and G signal charges are added together and Ye and Mg signal charges are added together. Thus, signal charges of two pixels at diagonally adjacent locations are added together. A transfer pulse is then applied to the horizontal charge transfer unit 3 so as to output the added signal charges. FIG. 14 illustrates the state after the completion of the output of the added signal charges. If the signal output in the above process is denoted by S(odd), S(odd) is a sequence of (Cy+G) and (Ye+Mg) periodically appearing in this order.

Figure 15:
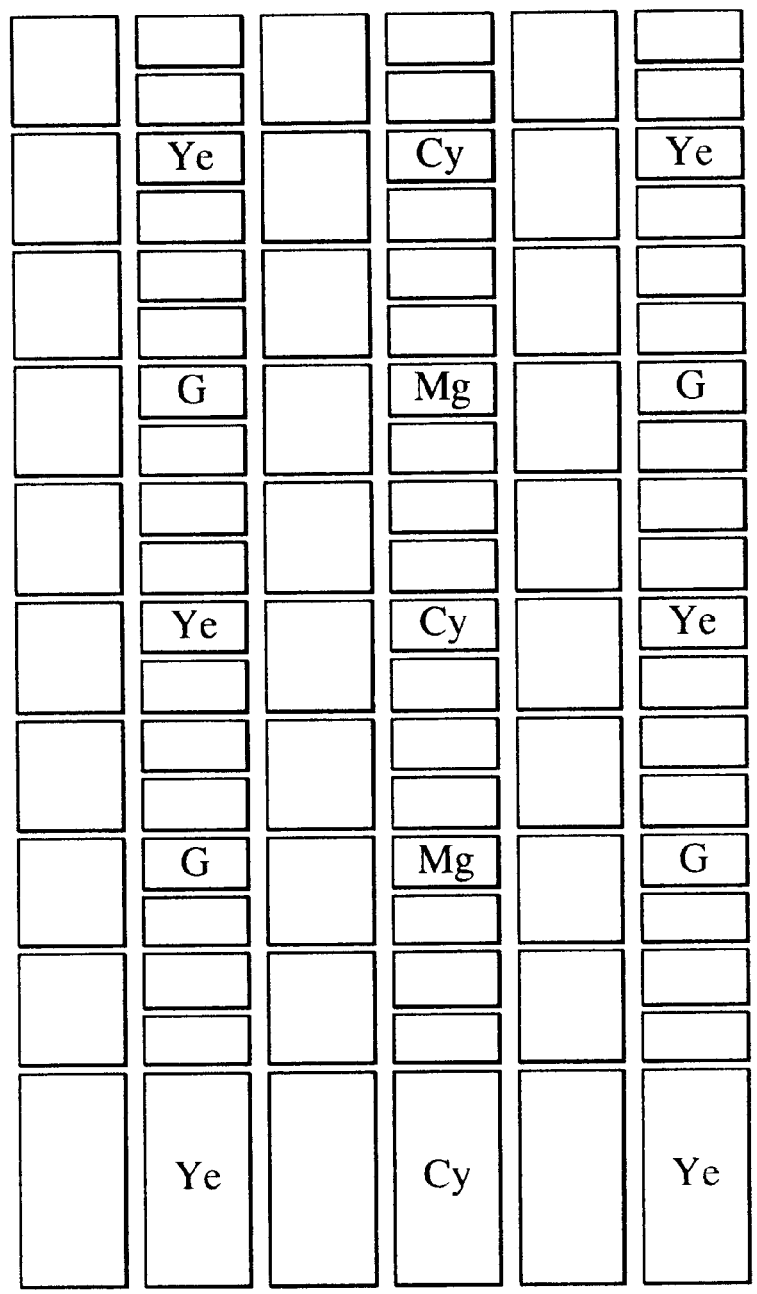
Figure 16:
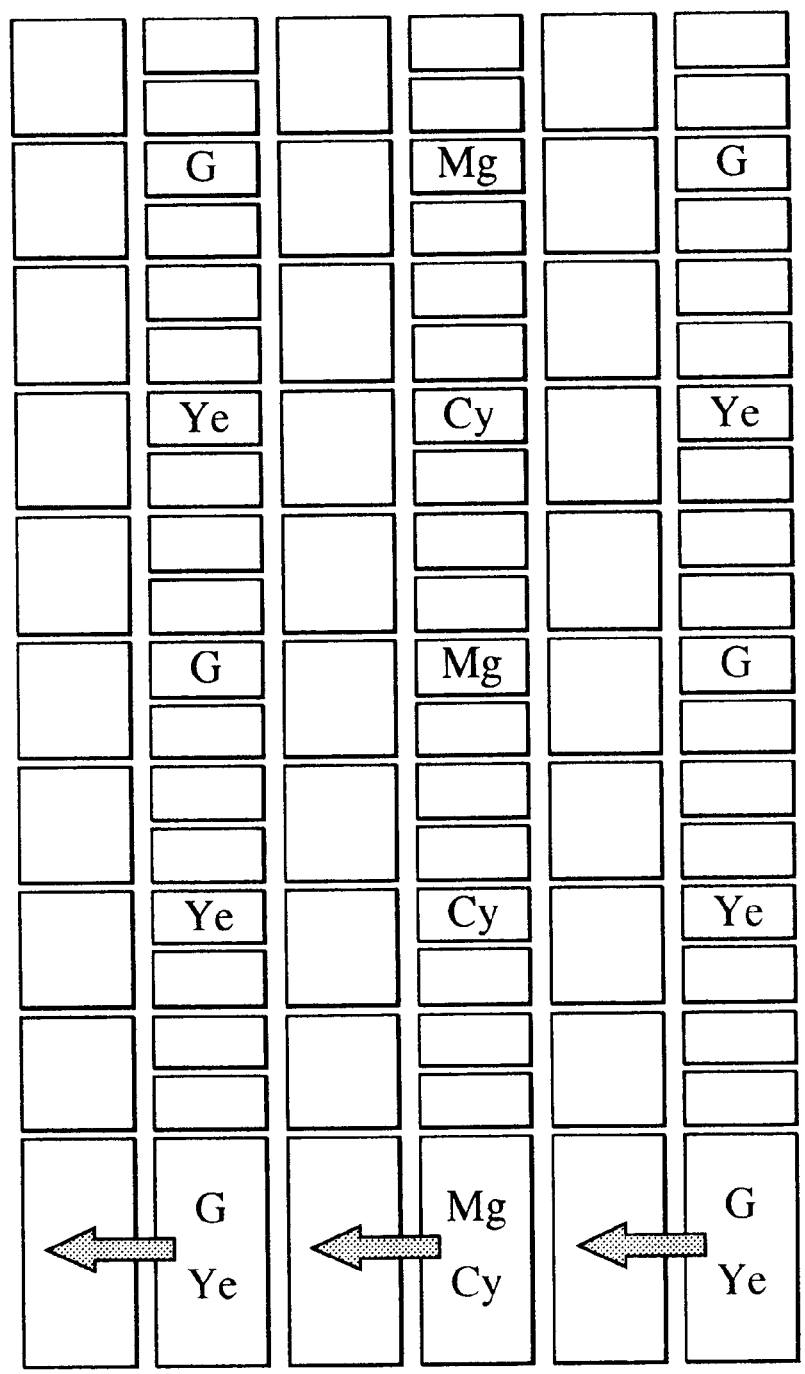
Figure 17:
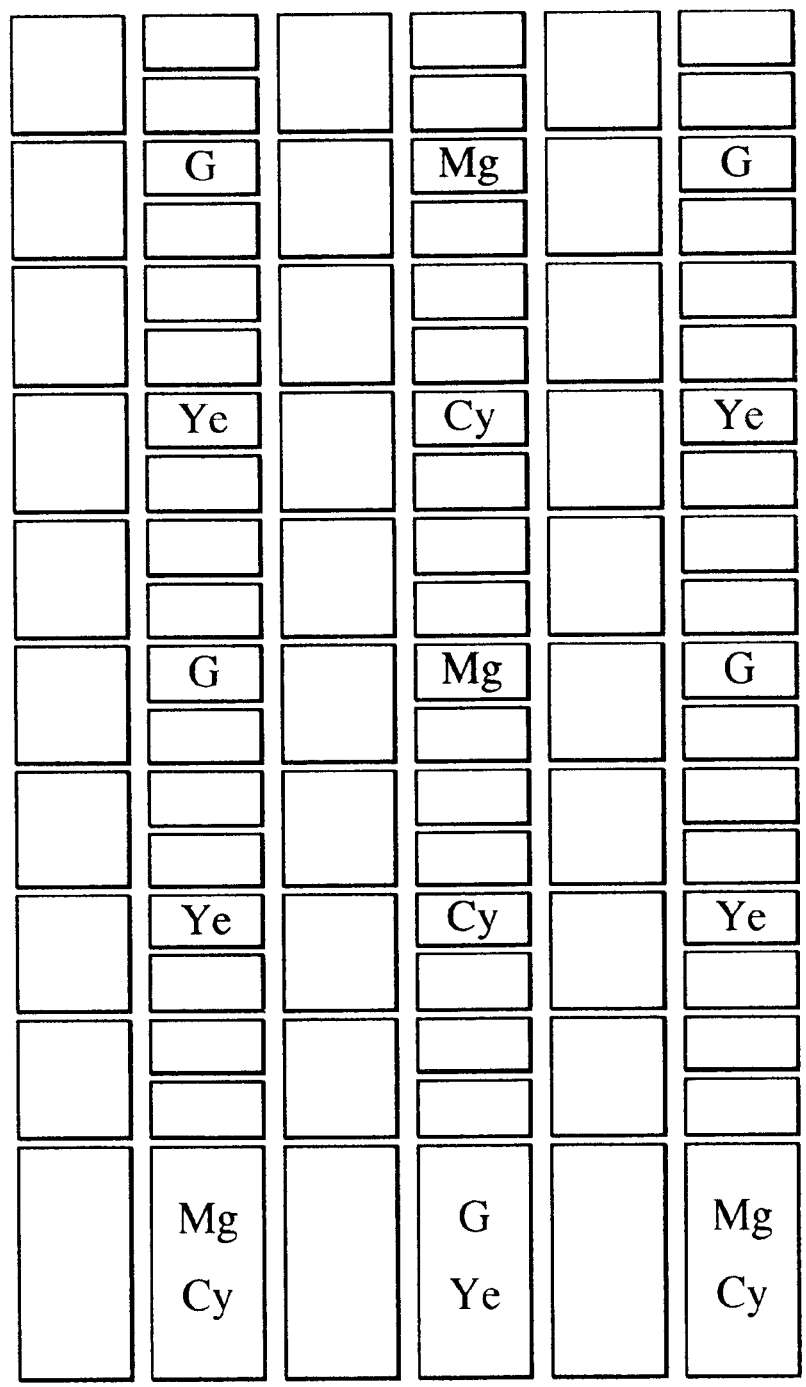
Figure 18:
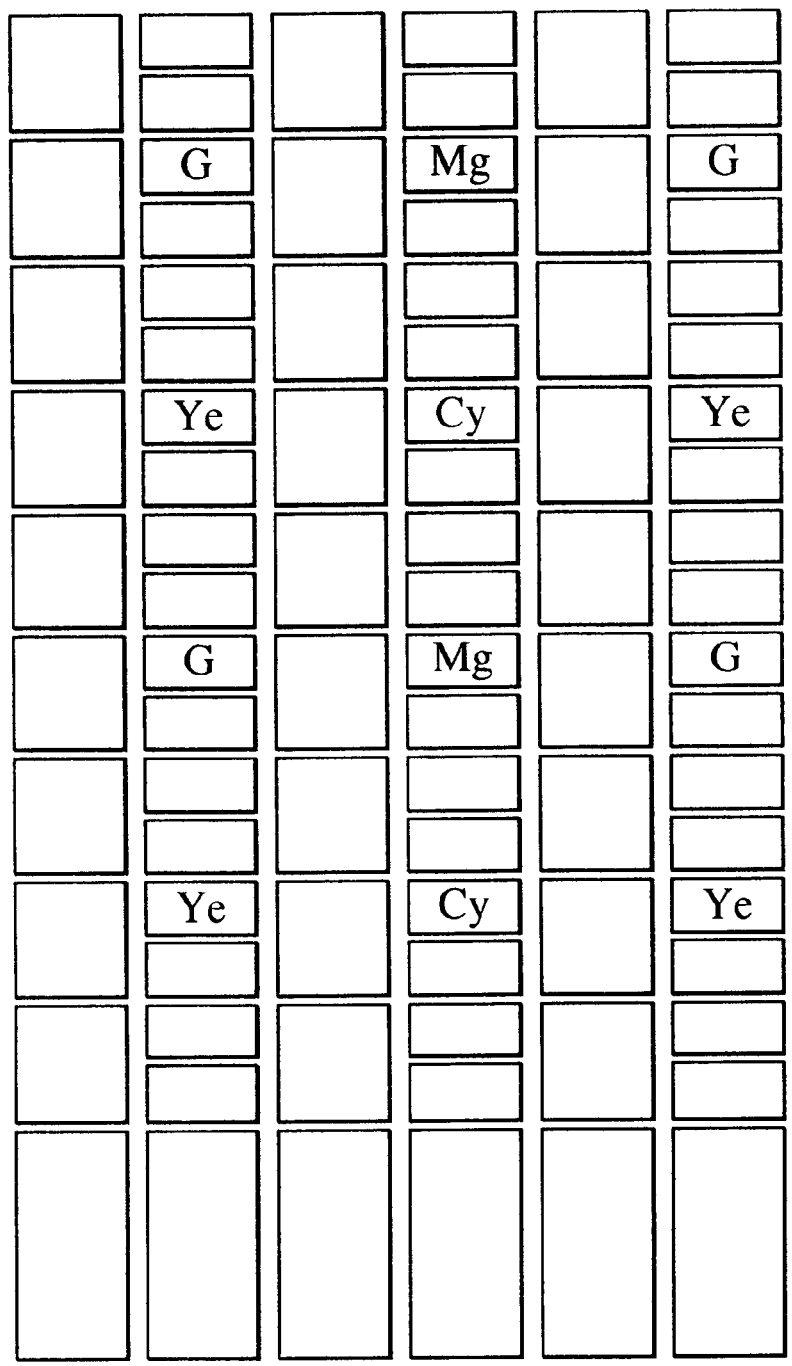

After that, as shown in FIG. 15, the signal charges are transferred in the vertical direction by an amount corresponding to two pixels or four electrodes so that Ye and Cy signal charges are transferred to the horizontal charge transfer unit 3. Furthermore, the signal charges are transferred in the vertical direction by an amount corresponding to 2 pixels or four electrodes so as to transfer the G and Mg signal charges to the horizontal charge transfer unit 3. As a result, Ye and G signal charges are added together and Cy and Mg signal charges are added together. Thus, signal charges of two pixels at vertically adjacent locations are added together. The signal charges are then transferred in the horizontal direction by an amount corresponding to one pixel so that the signal charges are now located in the order (Cy+Mg) and (Ye+G) as shown in FIG. 17. A transfer pulse is then applied to the horizontal charge transfer unit 3 so as to output the added signal charges. FIG. 18 illustrates the state after the completion of the output of the added signal charges. If the signal output in the above process is denoted by S(even), S(even) is a sequence of (Cy+Mg) and (Ye+G) appearing periodically in this order. In the above process, S(odd) and S(even) are both obtained in the form of a color difference line-sequential signal. In the above process, the one-pixel horizontal transfer shown in FIG. 17 is performed so as to adjust the timing between S(odd) and S(even). Furthermore, the process described above with reference to FIGS. 11–18 is performed periodically so that pixel signals are read from particular two lines of every four lines and the pixel signals are output after adding the pixel signals of two lines into a pixel signal of one line. The addition of pixel signals of two lines is performed alternately for diagonally adjacent two pixels and for vertically adjacent two pixels so that S(odd) and S(even) are alternately output into the form of a color difference line-sequential signal.

Figure 19:
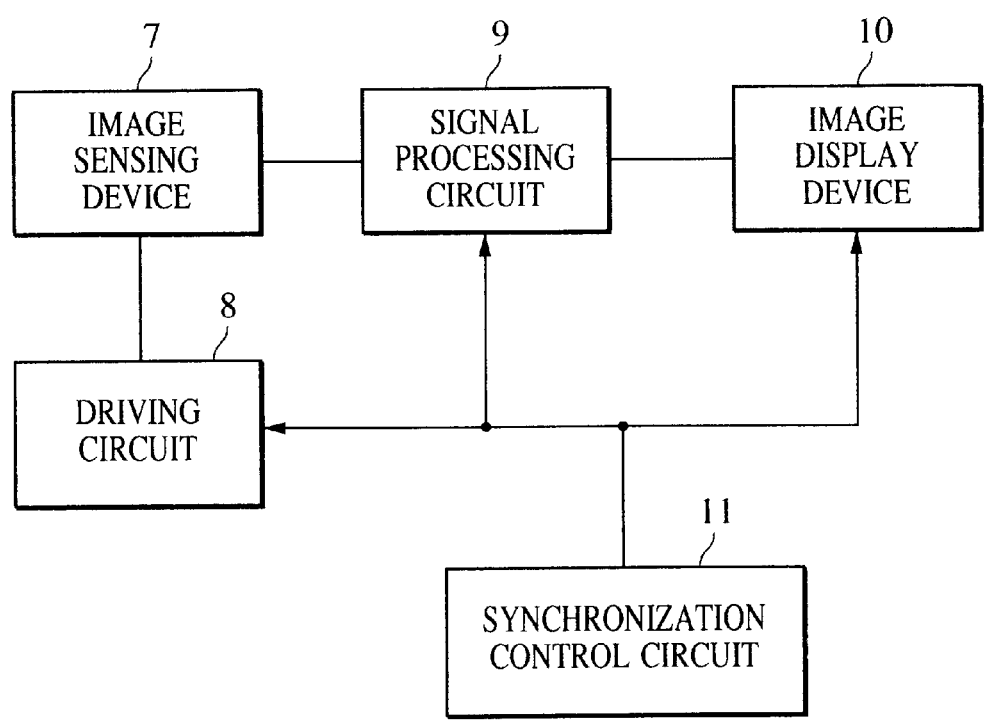
FIG. 19 is a block diagram of a solid state image pickup apparatus according to the present invention.

FIG. 19 is a block diagram illustrating an image pickup apparatus employing a combination of a solid state image sensing device and an image display device having a smaller number of pixels in the vertical direction compared with the number of pixels that can be output in the vertical direction by the solid state image sensing device in each image sensing operation, according to the present embodiment of the invention.

In FIG. 19, reference numeral 7 denotes the solid state image sensing device, 8 denotes the driving circuit of the solid state image sensing device, 9 denotes a signal processing circuit, 10 denotes the image display device having a smaller number of pixels in the vertical direction compared with the number of pixels that can be output in the vertical direction by the solid state image sensing device during one image sensing operation, and 11 denotes a synchronization control circuit for controlling the operation over the entire image pickup apparatus. In response to a control signal output by the synchronization control circuit 11, the driving circuit 8 generates a driving pulse thereby driving the solid state image sensing device 7 so that the solid state image sensing device 7 outputs a signal including a properly reduced number of pixels. The signal output by the solid state image sensing device 7 is processed by the signal processing circuit 9 in synchronization with a control signal output by the synchronization control circuit 11. Because the solid state image sensing device 7 outputs a signal in the form of a color difference line-sequential signal in the above-described process, color signal processing which is required in a video camera or the like can be performed on the output signal of the solid state image sensing device 7. If necessary, interpolation or reduction in the number of pixels in the horizontal direction is further performed depending on the number of pixels in the horizontal direction of the image display device 10. After that, in synchronization with the control signal output by the synchronization control circuit 11, the signal is displayed in the form of a two-dimensional image on the image display device 10.

Figure 1:
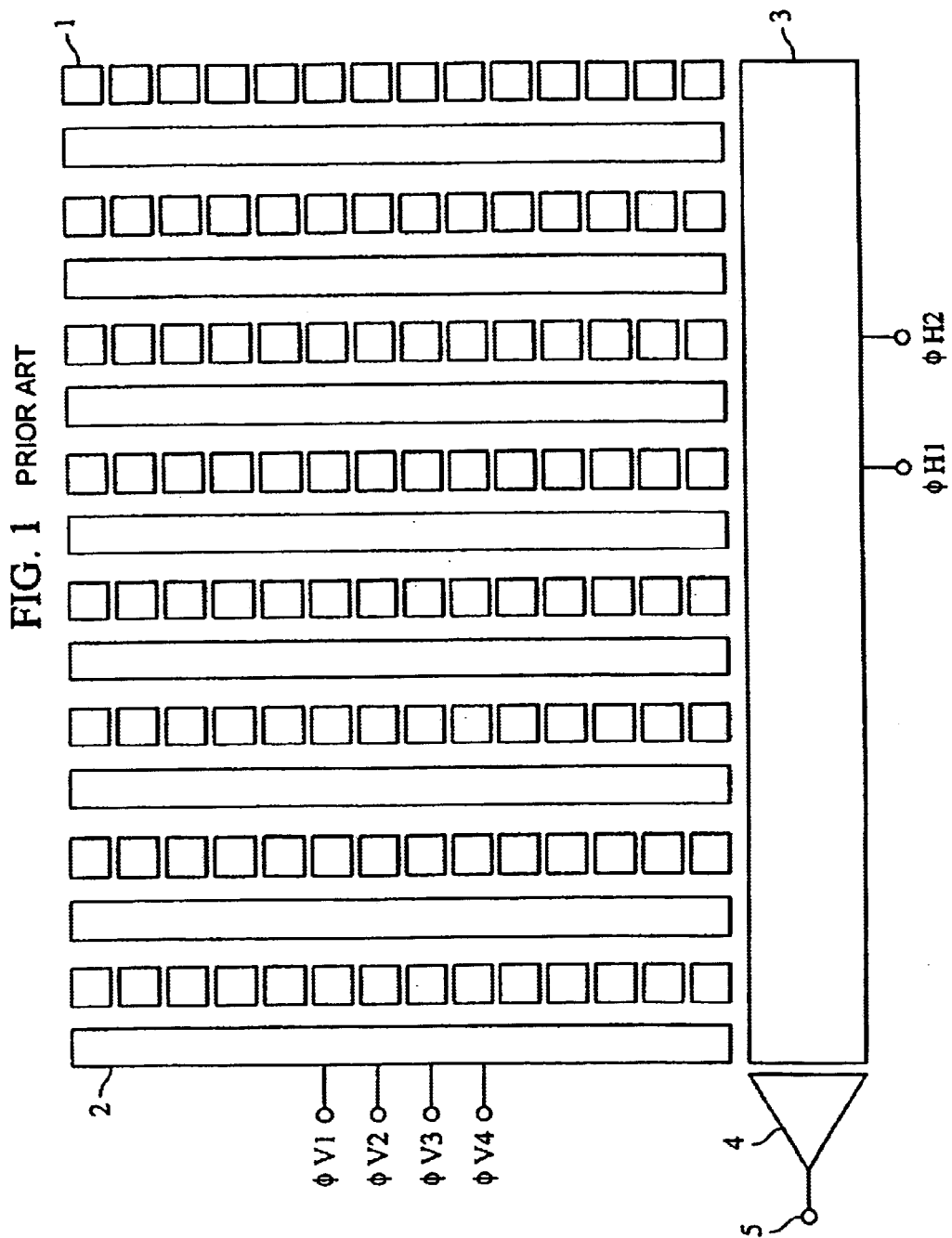
FIG. 1 is a schematic diagram illustrating the general layout of a conventional solid state image sensing device.
Figure 2:
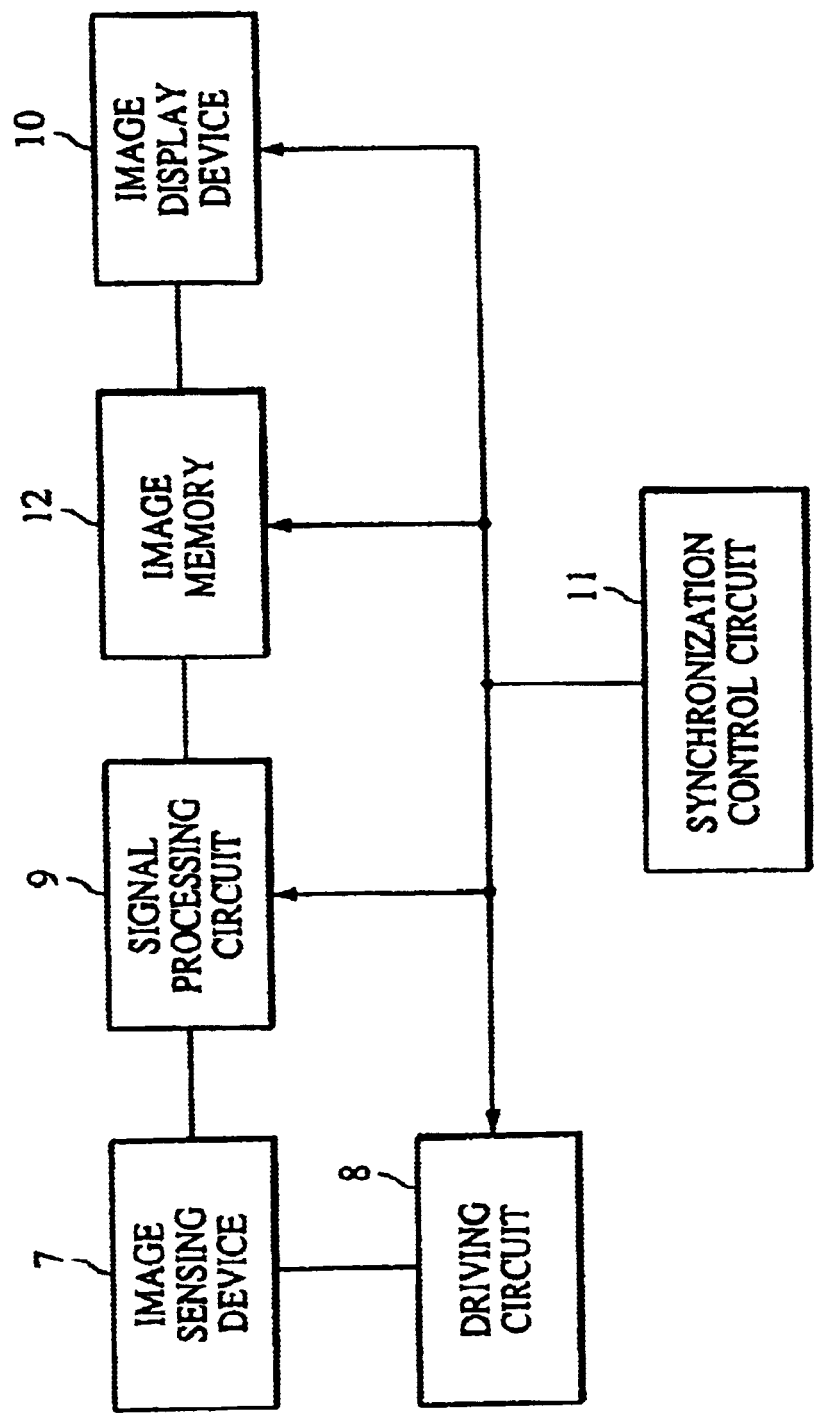
FIG. 2 is a block diagram illustrating the organization of a conventional solid state image pickup apparatus.

As can be understood from the above description, in the solid state image pickup apparatus employing the combination of the solid state image sensing device 7 and the image display device 10 having a smaller number of pixels in the vertical direction compared with the number of pixels that can be output in the vertical direction by the solid state image sensing device 7 in each image sensing operation, it is possible to read pixel signals from the solid state image sensing device 7 while skipping particular lines. Furthermore, the image pickup apparatus according to the present embodiment, includes the color filter array which is disposed such that a color image signal can be obtained from the pixel signals read for a reduced number of lines. Furthermore, it is possible to display an image at a speed in accordance with the displaying speed of the image display device 10 without having to employ an image memory 12 shown in FIG. 2 or a special vertical signal reduction means.

In FIGS. 7 and 9, in addition to the above-described operation, if a reading pulse is further applied to V7 and V5 of the vertical transfer electrodes so that the signal charges on the (4 m+1)th and (4 m+2)th lines are read into the vertical transfer electrodes V7 and V5, respectively, and these signal charges are output after performing the addition process, then it becomes possible to also accommodate an image display device capable of displaying an image in an interlaced fashion.

Second Embodiment

A second embodiment is described below with reference to FIGS. 3, 5, 7, 19, and 20–38. The structure and the operation shown in FIGS. 3, 4, 5, and 19 are similar to those in the first embodiment and thus they are not described in further detail herein.

The operation according to the present embodiment is described below with reference to FIGS. 20–38.

FIGS. 6–18 illustrate the operation of reading the signal charges accumulated in the respective pixels 1 covered with the corresponding color filters. In this specific example, n is set to 4 and pixel signals are read for particular two lines of every four lines and the pixel signals are output after adding together the pixel signals of every two pixel groups of two lines into a pixel signal of one line. Color filters, vertical transfer electrodes, and horizontal transfer electrodes are disposed as shown in FIG. 5.

In the present embodiment, the reading operation is performed such that pixel signals are read along the third and fourth lines of every four lines and thus these lines are represented by (4 m+3)th and (4 m+4)th lines where m is an integer equal to or greater than 0.

Figure 20:
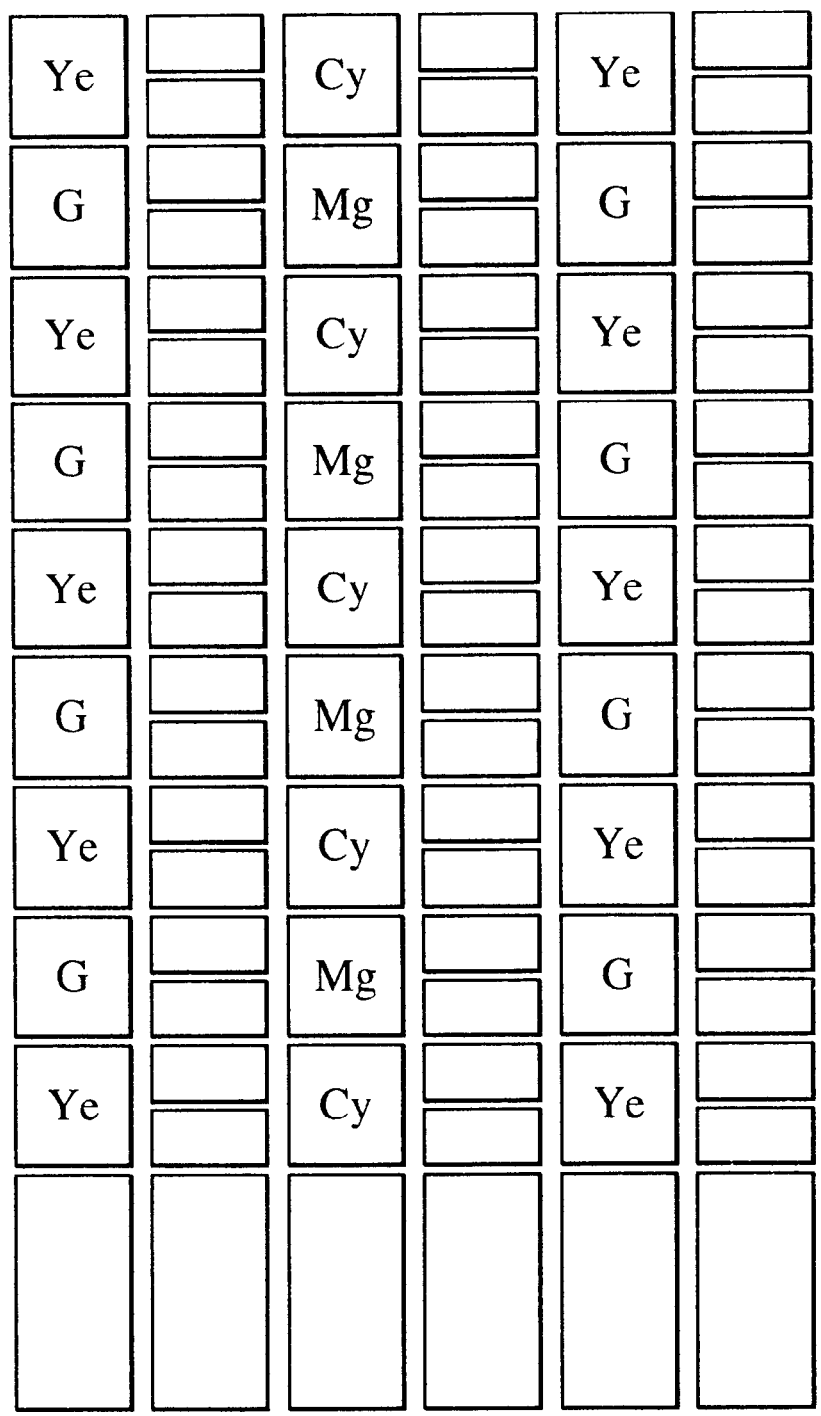
FIGS. 20–38 are schematic diagrams similar to FIGS. 6–18 but illustrating different stages in a reading operation of a solid state image sensing device according to a second or a fourth embodiment of the invention.
Figure 21:
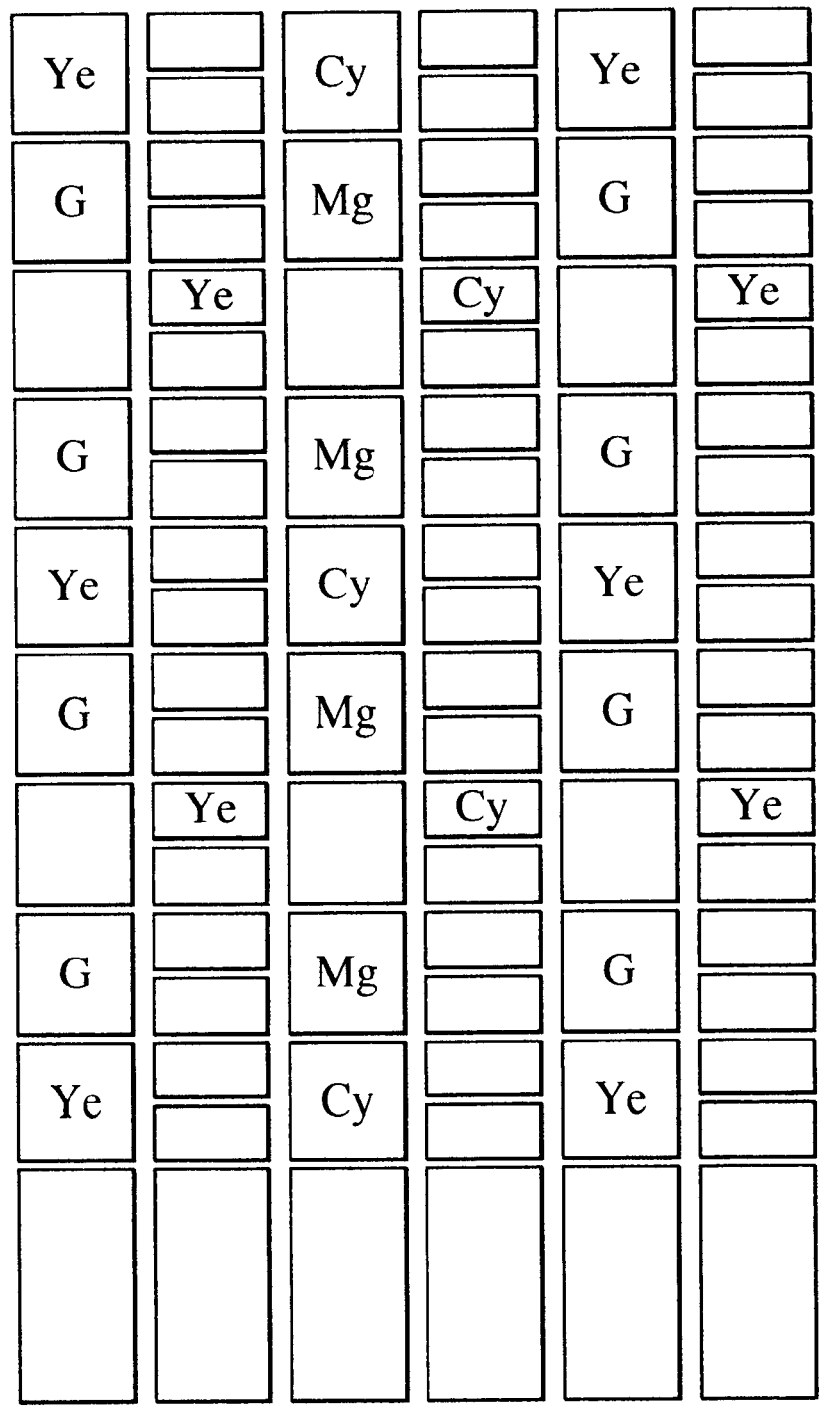
Figure 22:
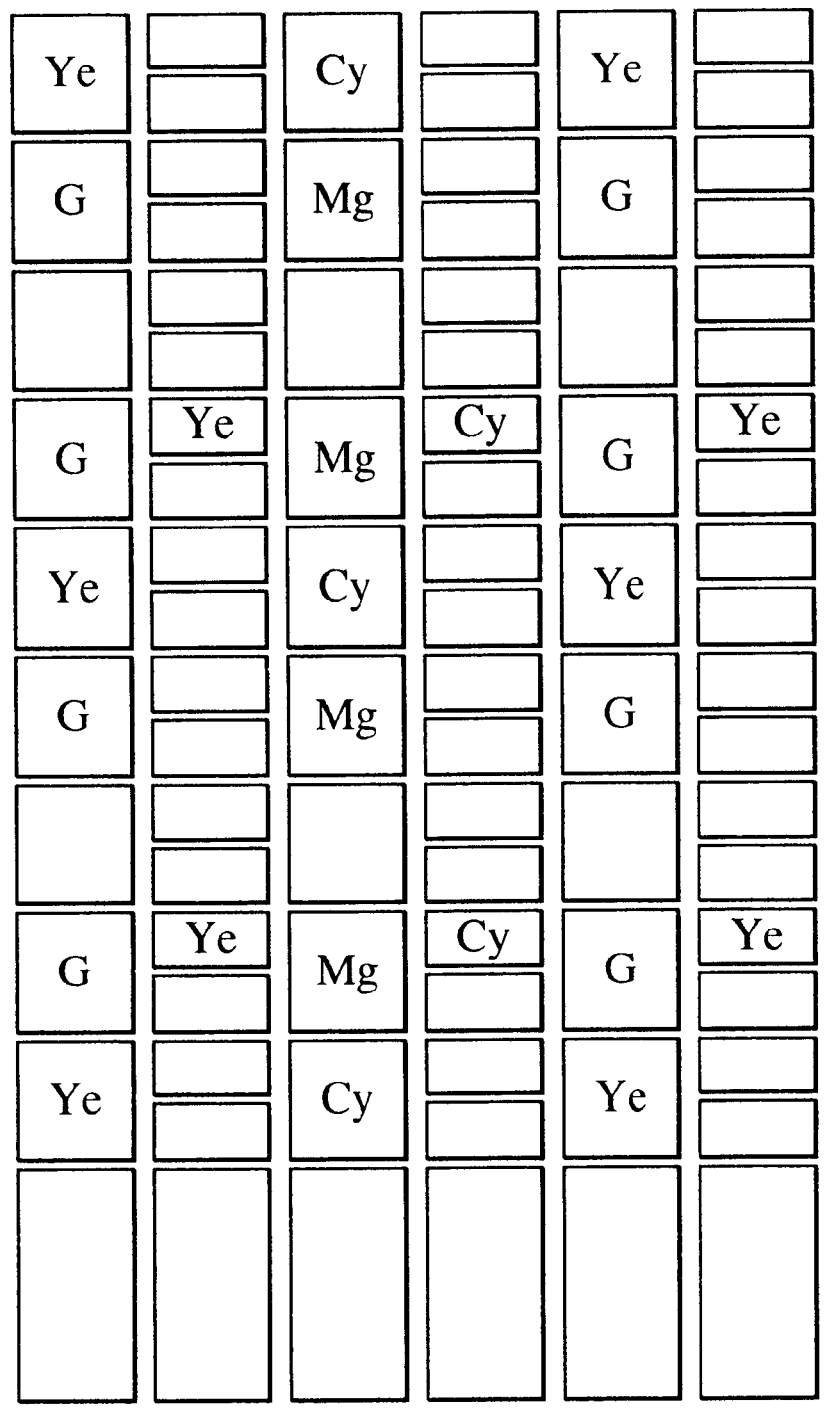
Figure 23:
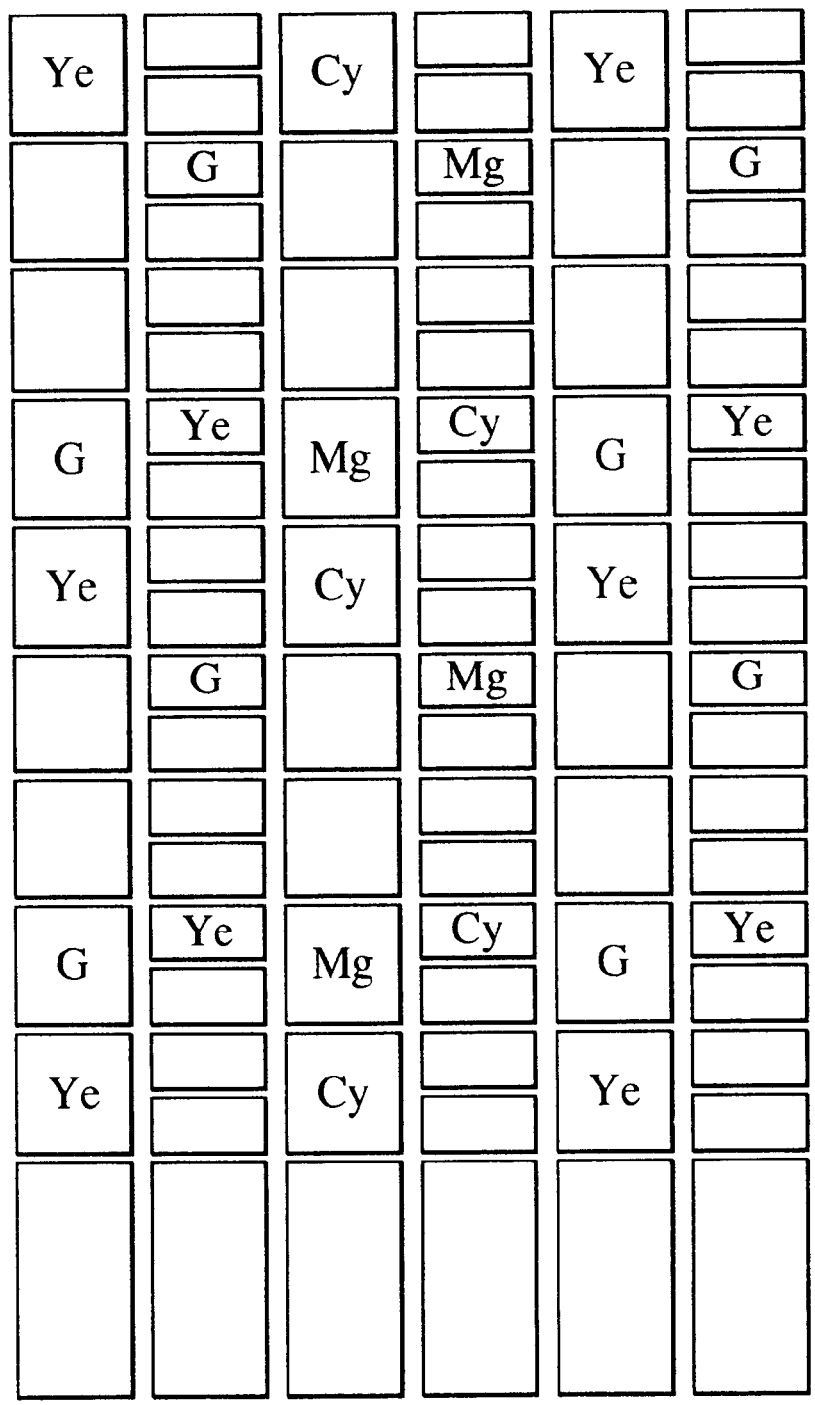
Figure 24:
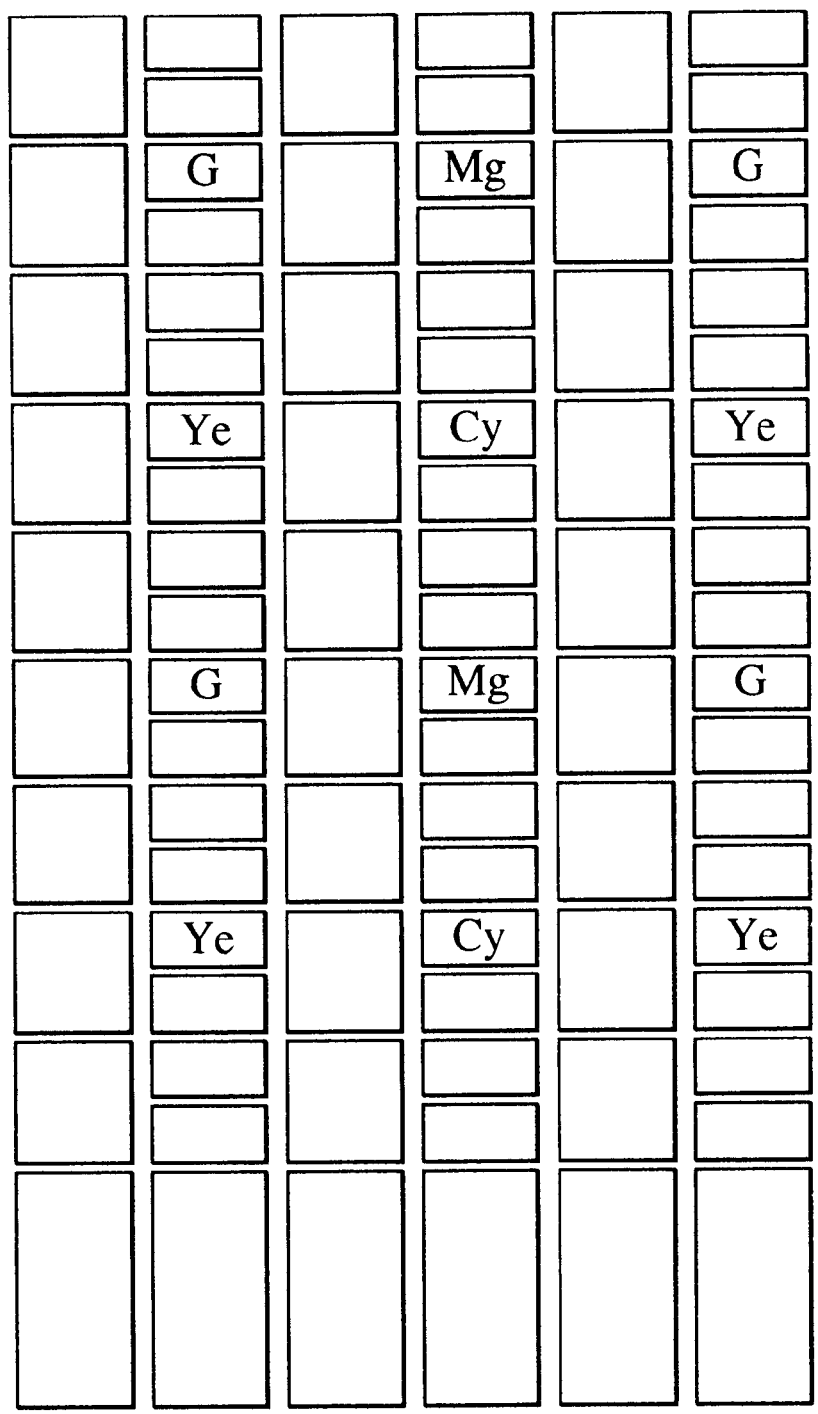

FIG. 20 illustrates the state in which accumulated signal charges are stored in the respective pixels 1 having their own color filter. First, as shown in FIG. 21, a reading pulse is applied to V3 of the vertical transfer electrodes so that Ye and Cy signal charges on the (4 m+3)th lines are read into the corresponding vertical transfer electrodes V3 and transferred to the vertical transfer electrodes V5 as shown in FIG. 22. A reading pulse is then applied to V1 of the vertical transfer electrodes so that G and Mg signal charges on the (4 m+4)th lines are read into the corresponding vertical transfer electrodes V1, as shown in FIG. 23. After that, signal charges on the (4 m+1)th and (4 m+2)th lines which were not read out in the above process are swept out as shown in FIG. 24. The sweeping may be performed for example into a substrate. Upon completion of the sweeping operation, the pixels 1 start to accumulate signal charges via photoelectric conversion although the detailed description is not given here.

Figure 25:
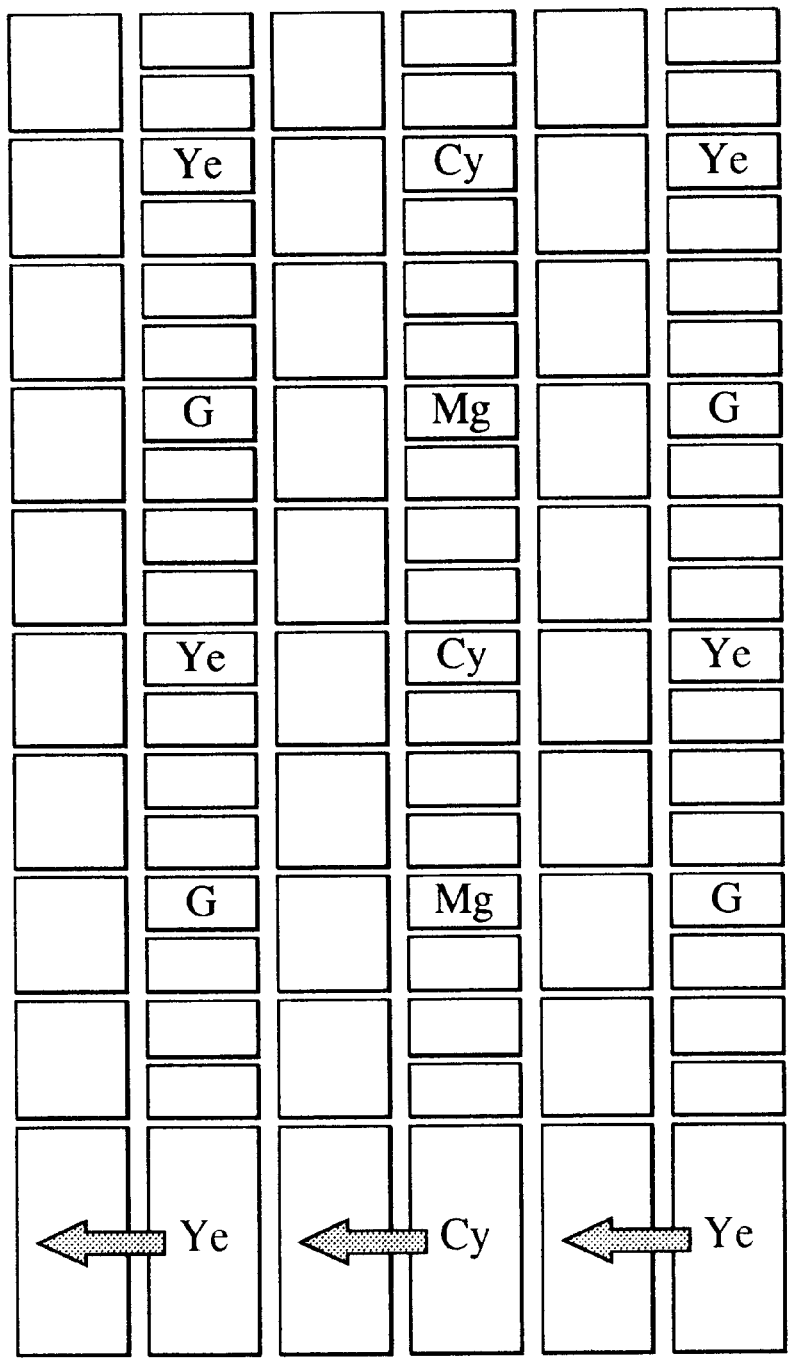
Figure 26:
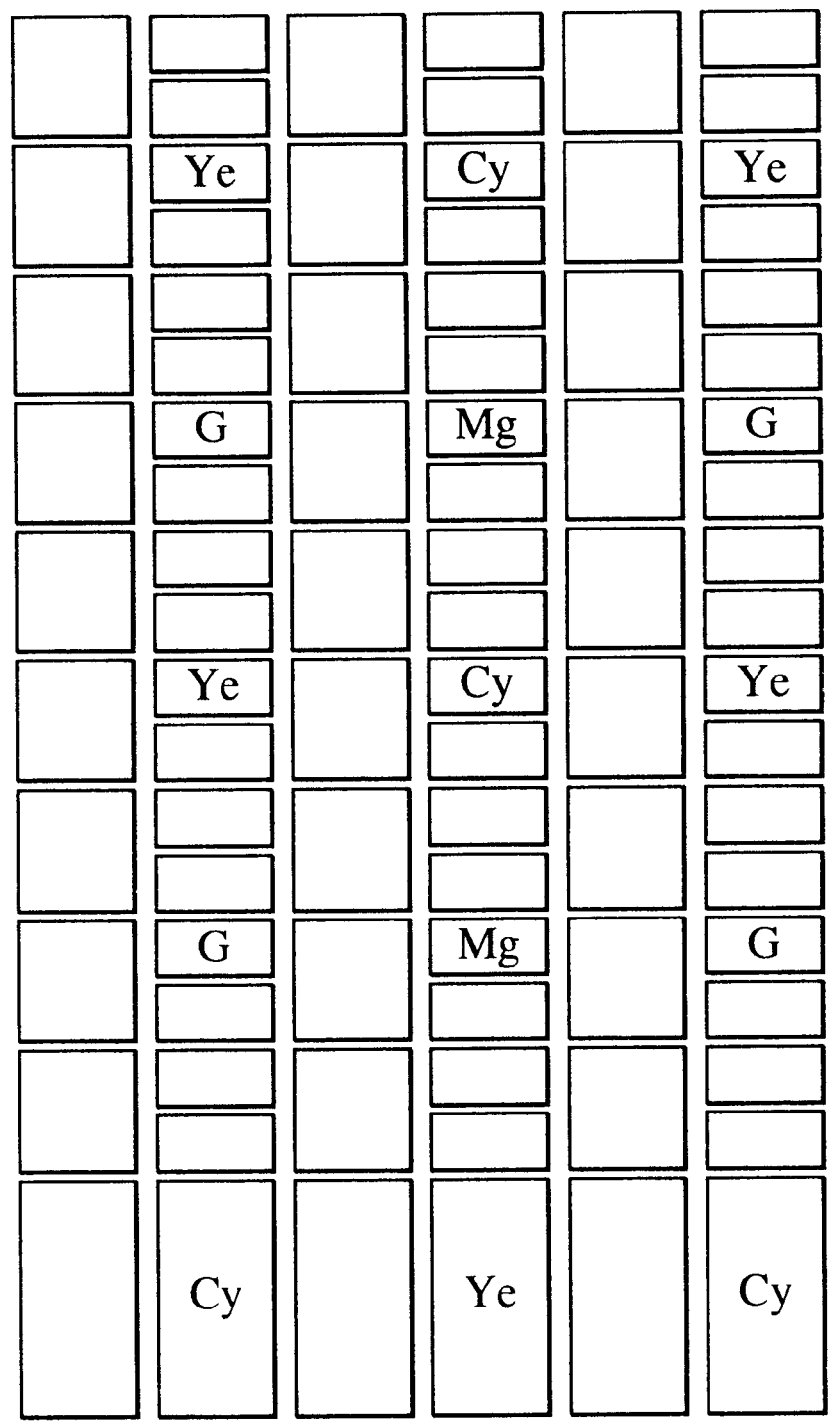
Figure 27:
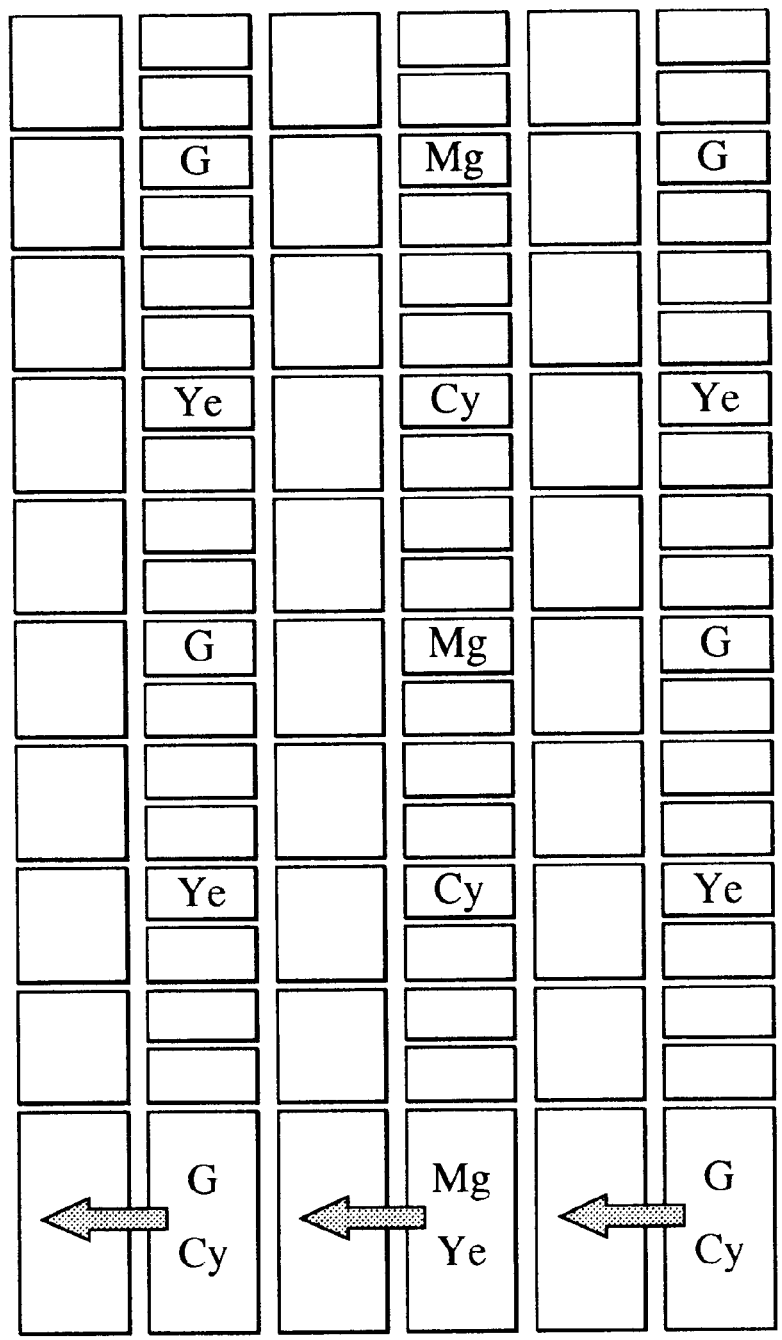

Then, as shown in FIG. 25, the signal charges are transferred in the vertical direction by an amount corresponding to two pixels or four electrodes thereby transferring the Ye and Cy signal charges to the horizontal charge transfer unit 3. The signal charges are then transferred in the horizontal direction by an amount corresponding to one pixel so that the signal charges are now located in the order Cy and Ye as shown in FIG. 26. After that, as shown in FIG. 27, the signal charges are transferred by an amount corresponding to two pixels or four electrodes in the vertical direction so as to transfer the G and Mg signal charges to the horizontal charge transfer unit 3. As a result, Cy and G signal charges are added together and Ye and Mg signal charges are added together. Thus, signal charges of two pixels at diagonally adjacent locations are added together.

Figure 28:
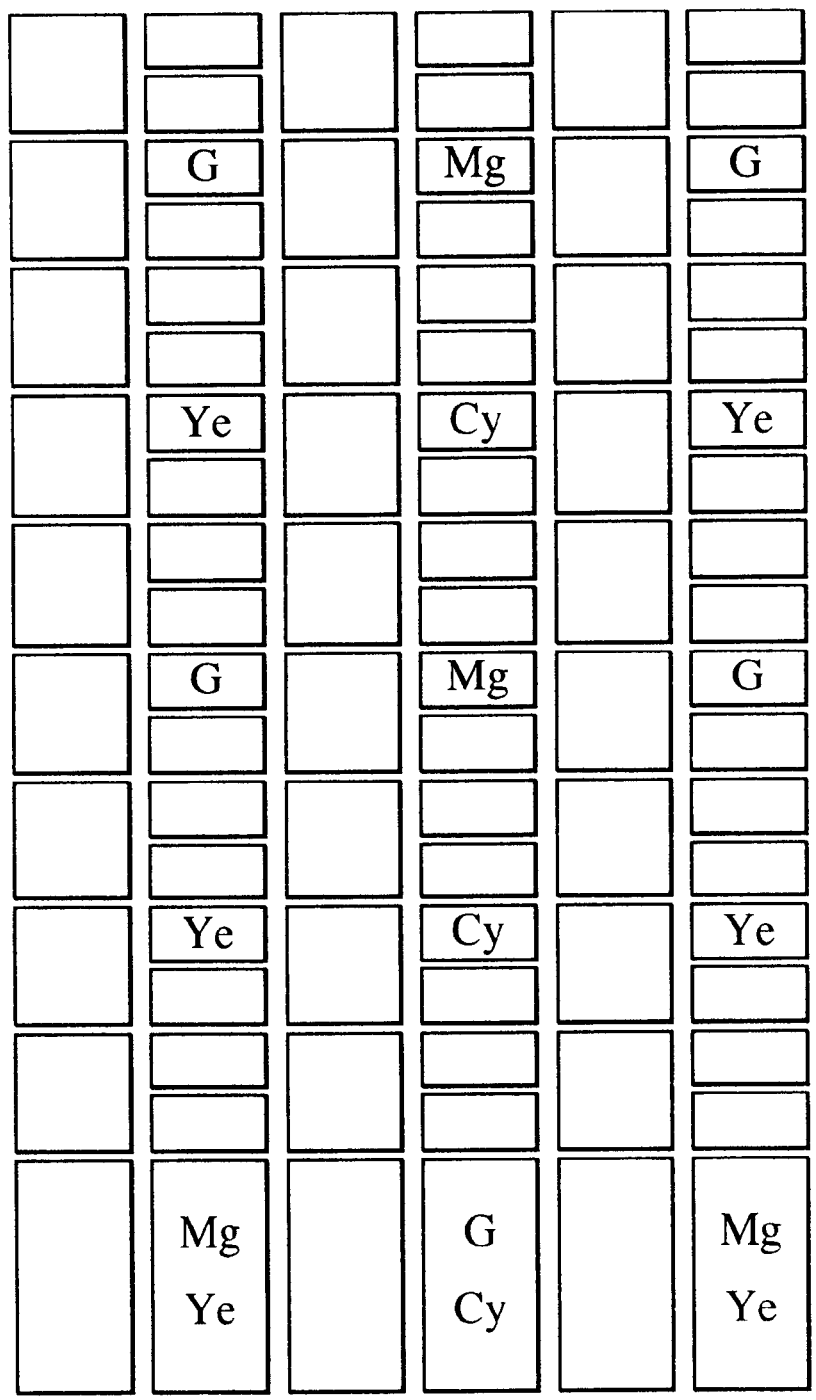
Figure 29:
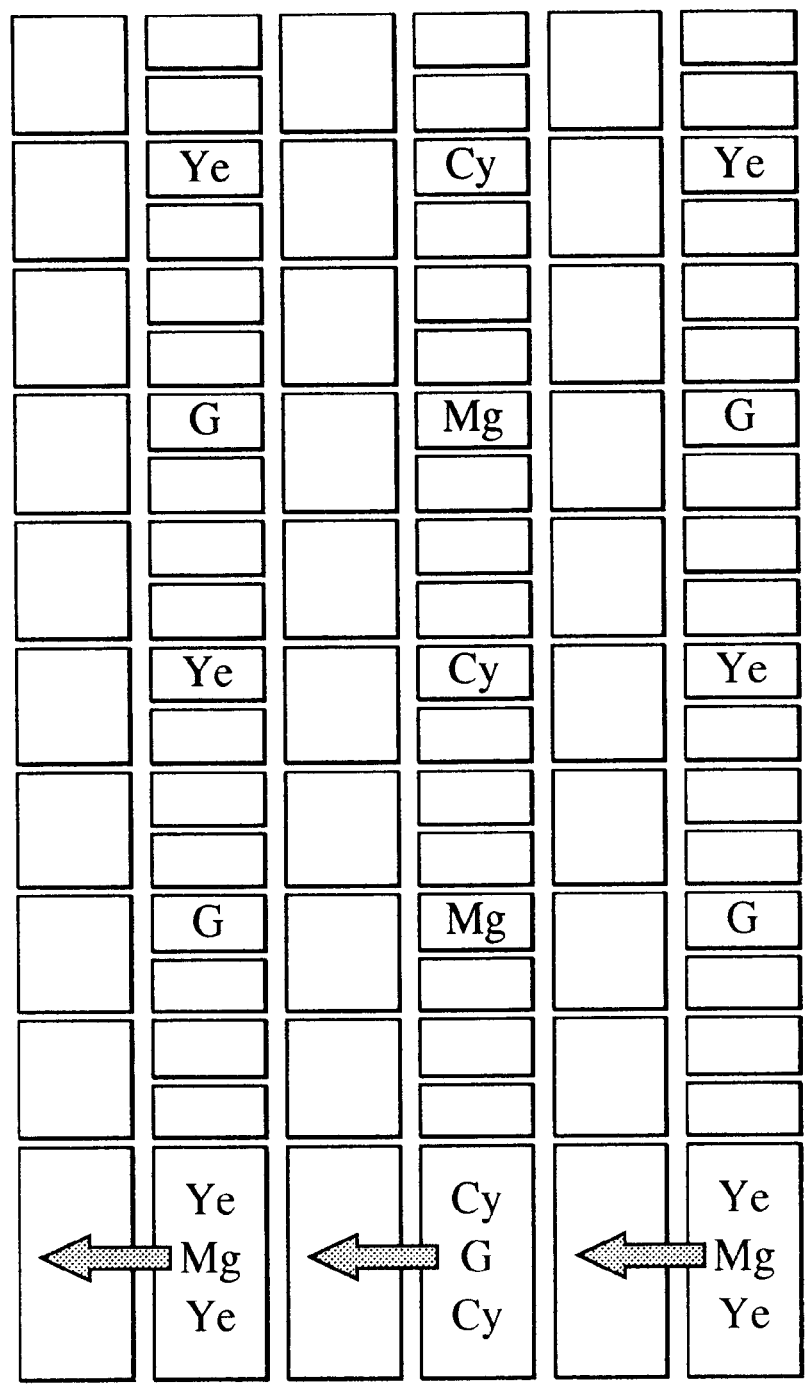

The signal charges are then transferred in the horizontal direction by an amount corresponding to one pixel so that the signal charges are now located in the order (Ye+Mg) and (Cy+G) as shown in FIG. 28. After that, as shown in FIG. 29, the signal charges are transferred in the vertical direction by an amount corresponding to two pixels or four electrodes so as to transfer the Ye and Cy signal charges to the horizontal charge transfer unit 3. As a result, (Ye+Mg) and Ye are added together and (Cy+G) and Cy are added together. Thus, signal charges of three pixels at diagonally adjacent locations are added together.

Figure 30:
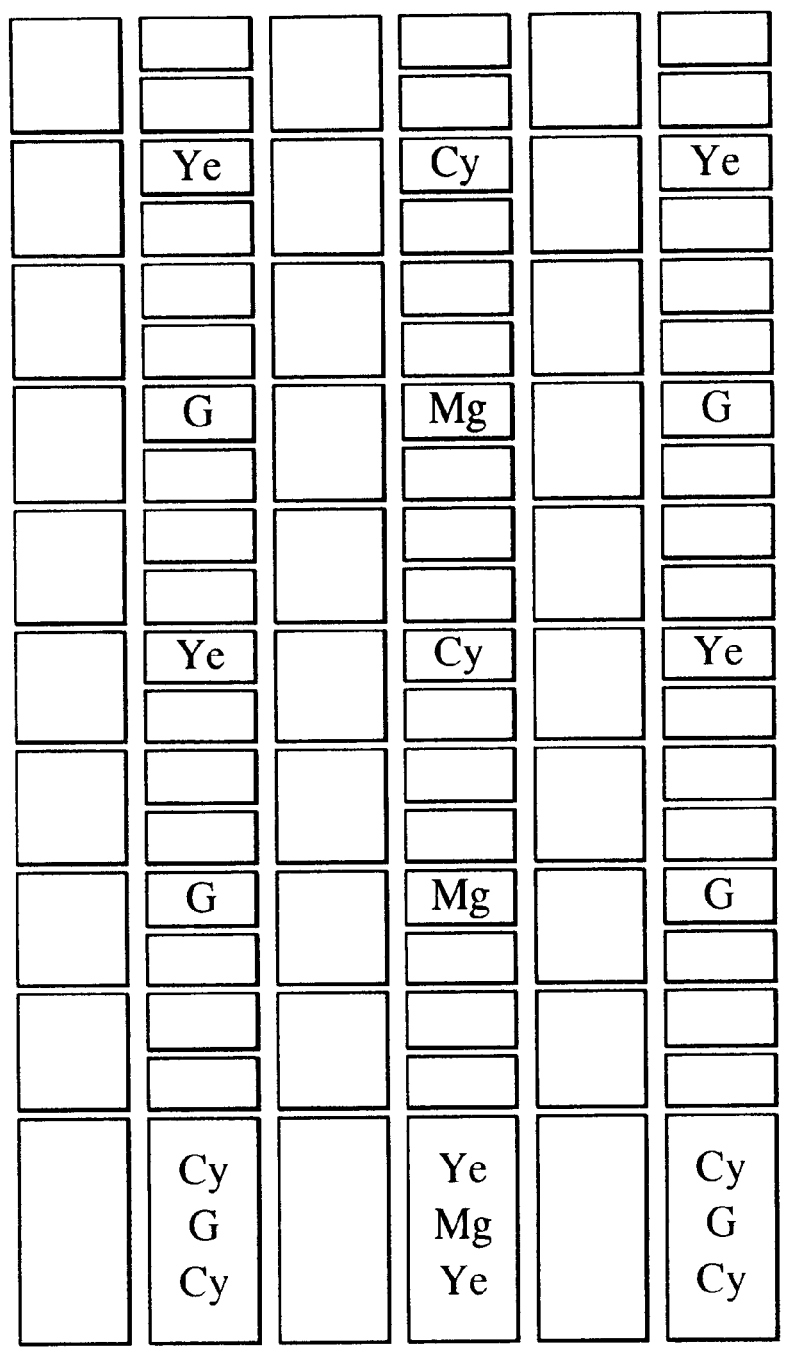
Figure 31:
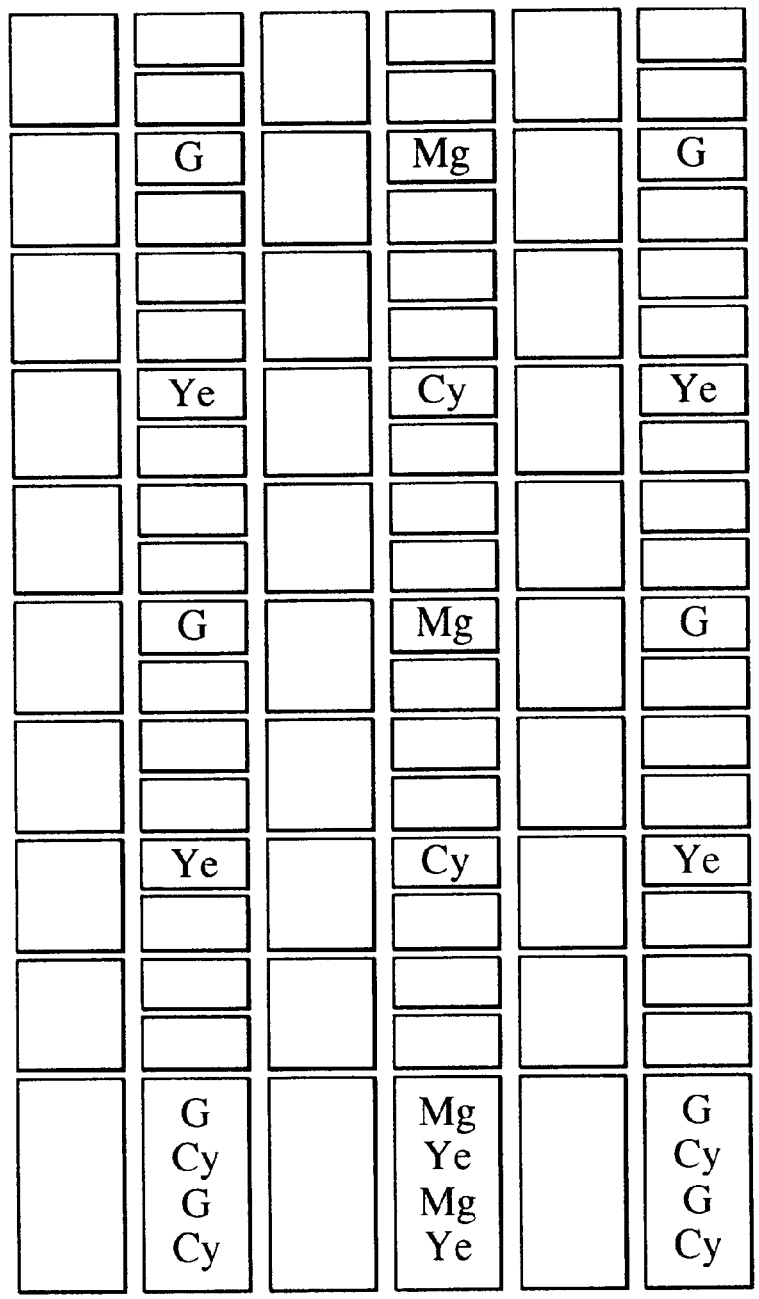

The signal charges are then transferred in the horizontal direction by an amount corresponding to one pixel so that the signal charges are now located in the order (Cy+G+Cy) and (Ye+Mg+Ye) as shown in FIG. 30. After that, as shown in FIG. 31, the signal charges are transferred in the vertical direction by an amount corresponding to two pixels or four electrodes so as to transfer the G and Mg signal charges to the horizontal charge transfer unit 3. As a result, (Cy+G+Cy) and G are added together and (Ye+Mg+Ye) and Mg are added together. Thus, signal charges of four pixels at diagonally adjacent locations are added together.

Figure 32:
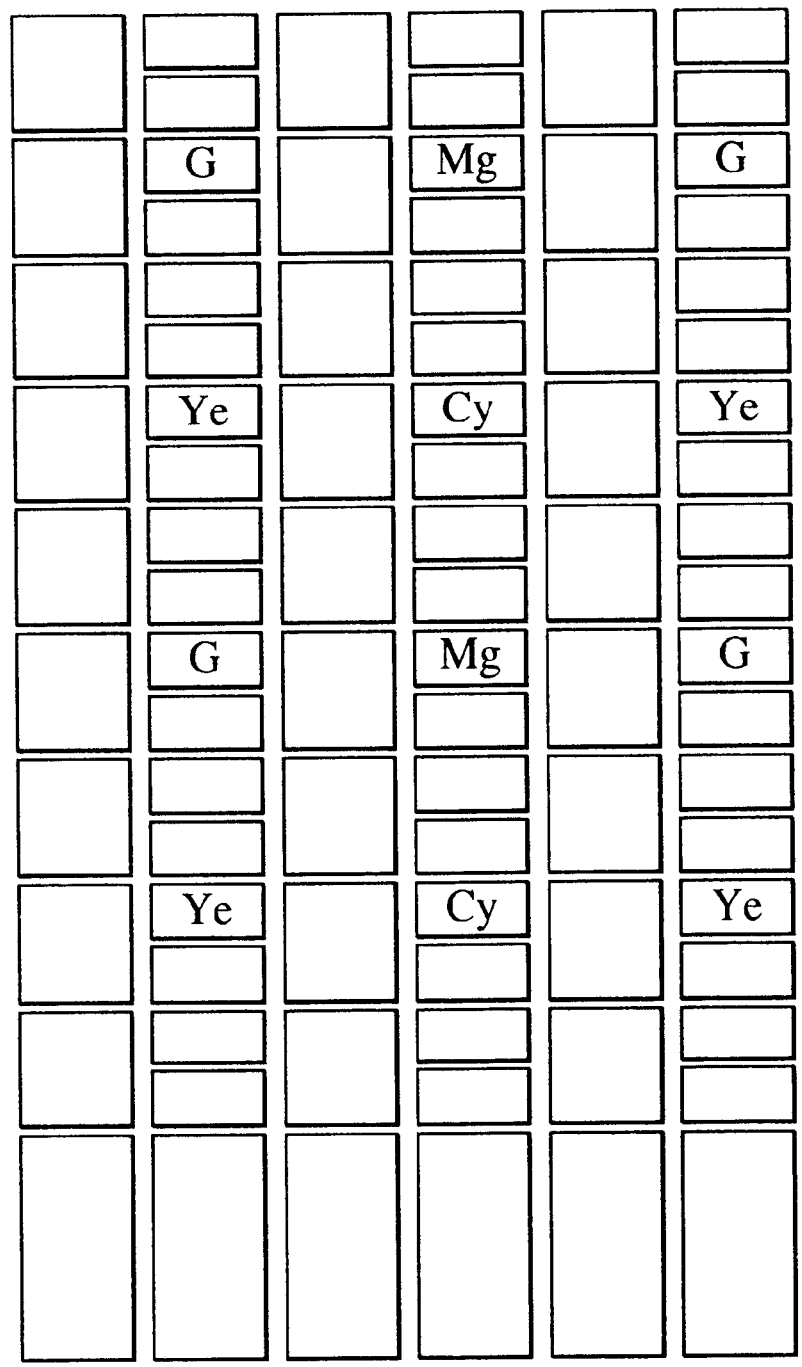
Figure 33:
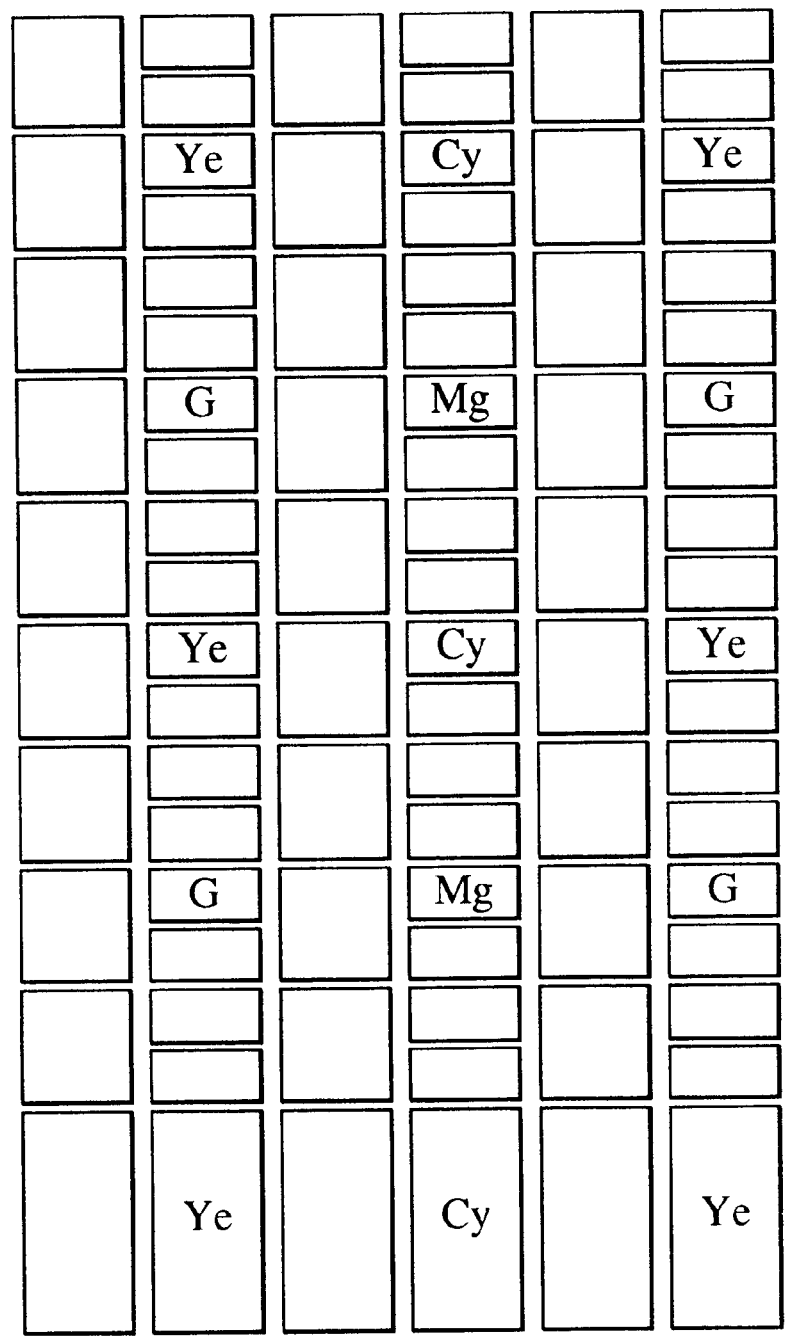
Figure 34:
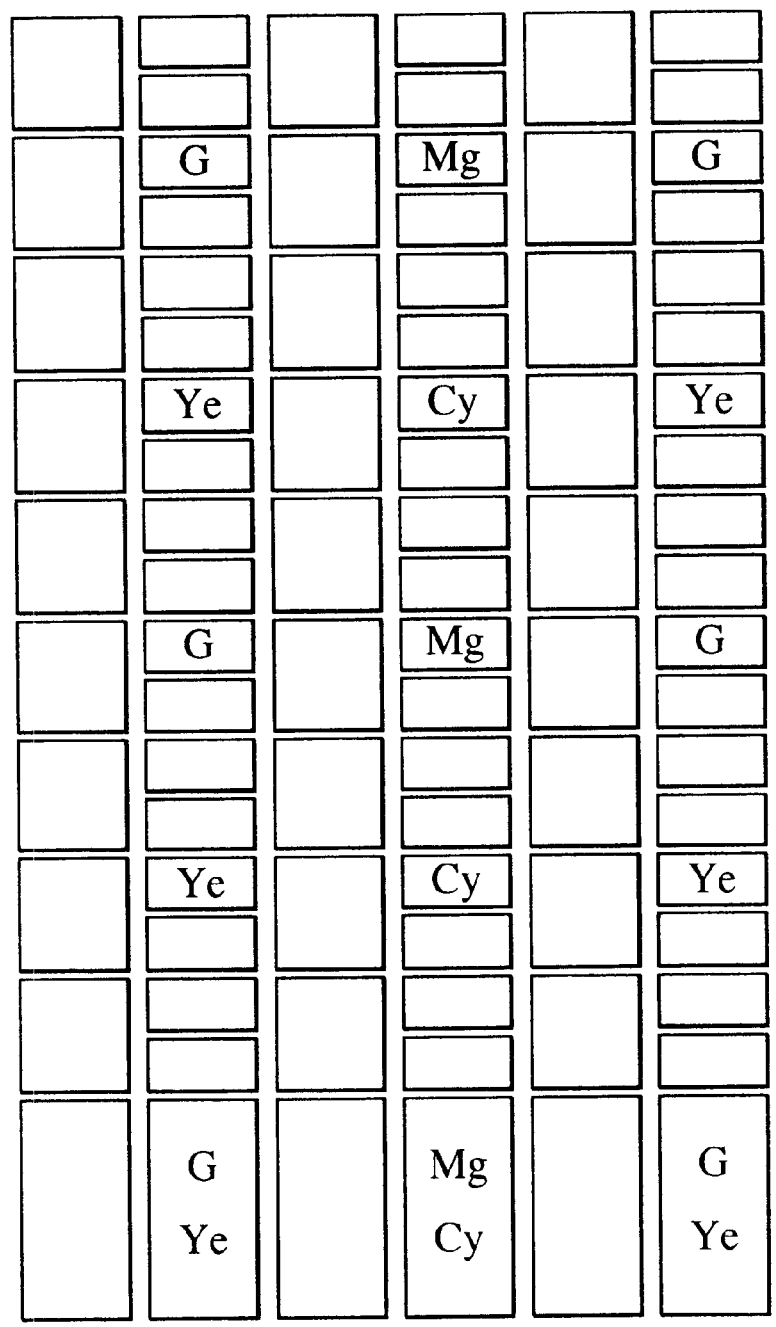
Figure 35:
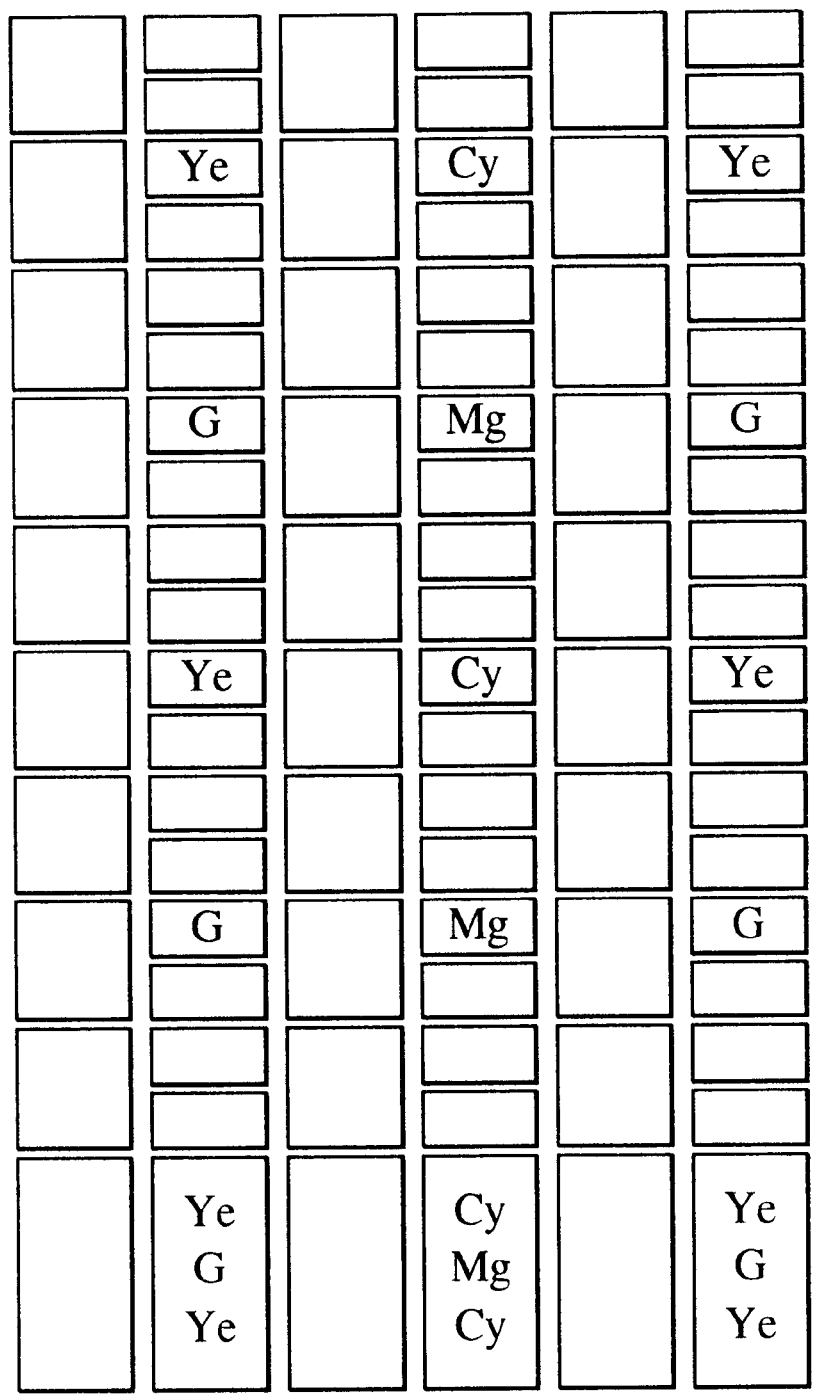
Figure 36:
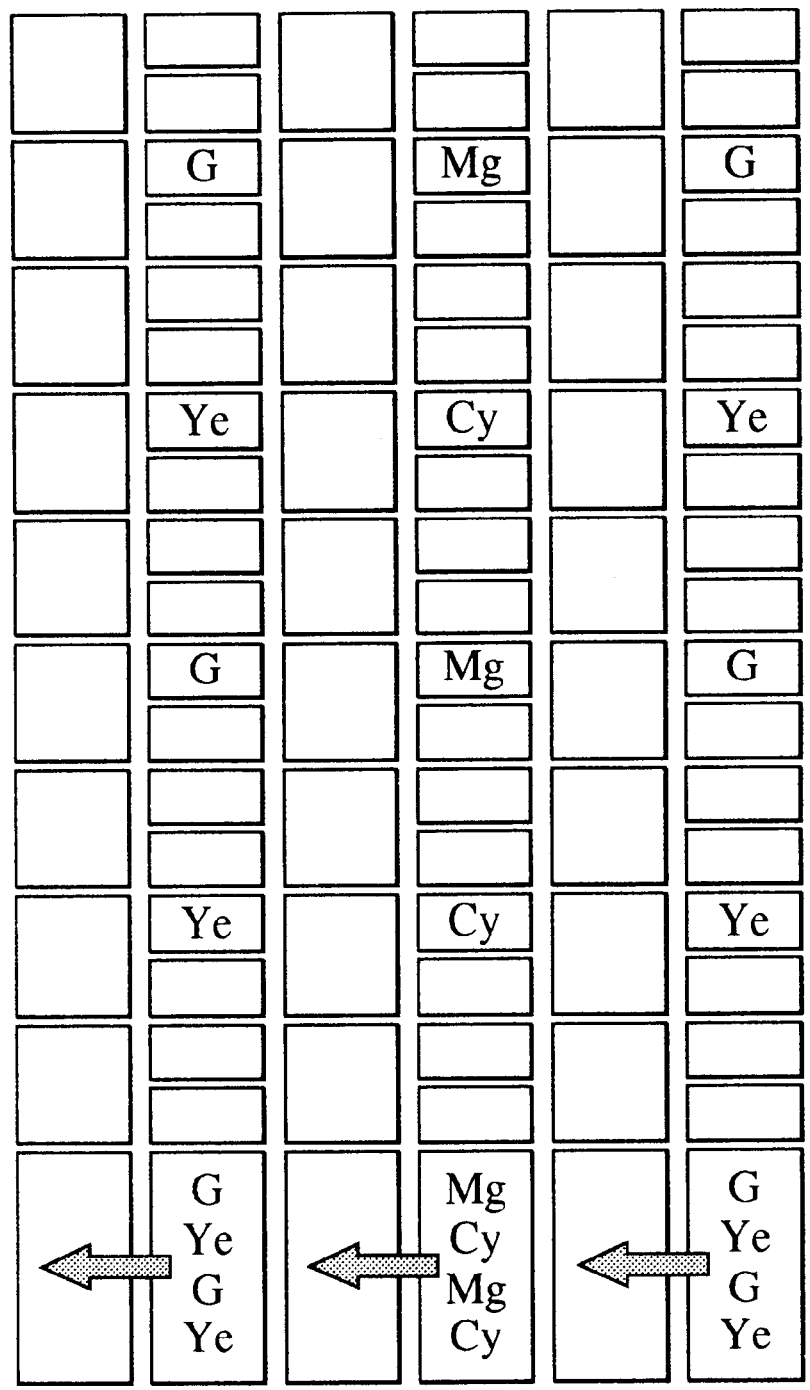

A transfer pulse is then applied to the horizontal charge transfer unit 3 so as to output the added signal charges. FIG. 32 illustrates the state after the completion of the output of the added signal charges. If the signal output in the above process is denoted by S'(odd), S'(odd) is a sequence of 2×(Cy+G) and 2×(Ye+Mg) appearing periodically in this order.

The above-described operation is performed periodically so as to transfer signal charges in the vertical direction by an amount corresponding to two pixels or four electrodes and add together Ye, G, Ye, and G, and add together Cy, Mg, Cy, and Mg, as shown in FIGS. 33, 34, 35, and 36 so that signal charges of four pixels at vertically adjacent locations are added together.

Figure 37:
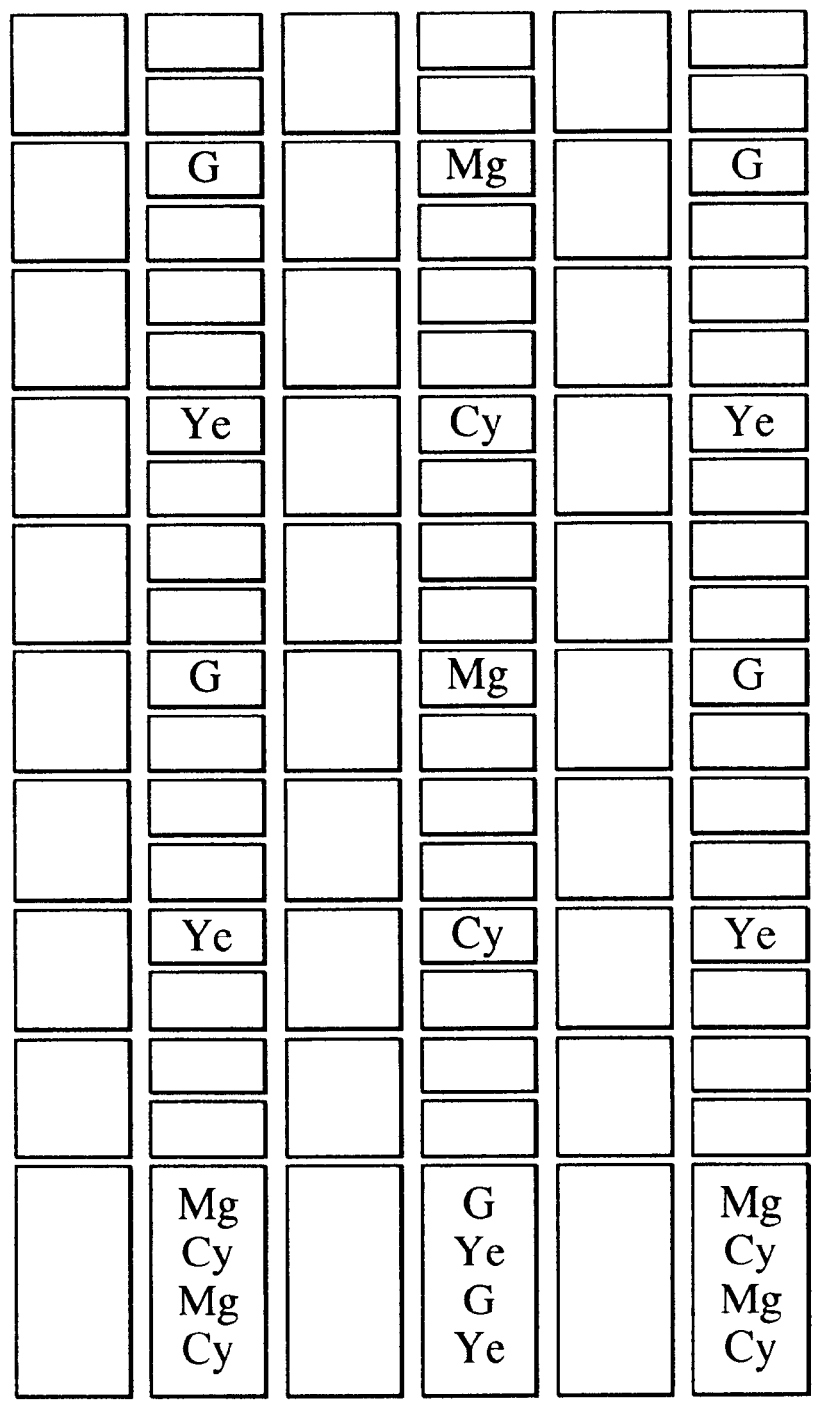

The signal charges are then transferred in the horizontal direction by an amount corresponding to one pixel so that the signal charges are now located in the order (Cy+Mg+Cy+Mg) and (Ye+G+Ye+G) as shown in FIG. 37.

Figure 38:
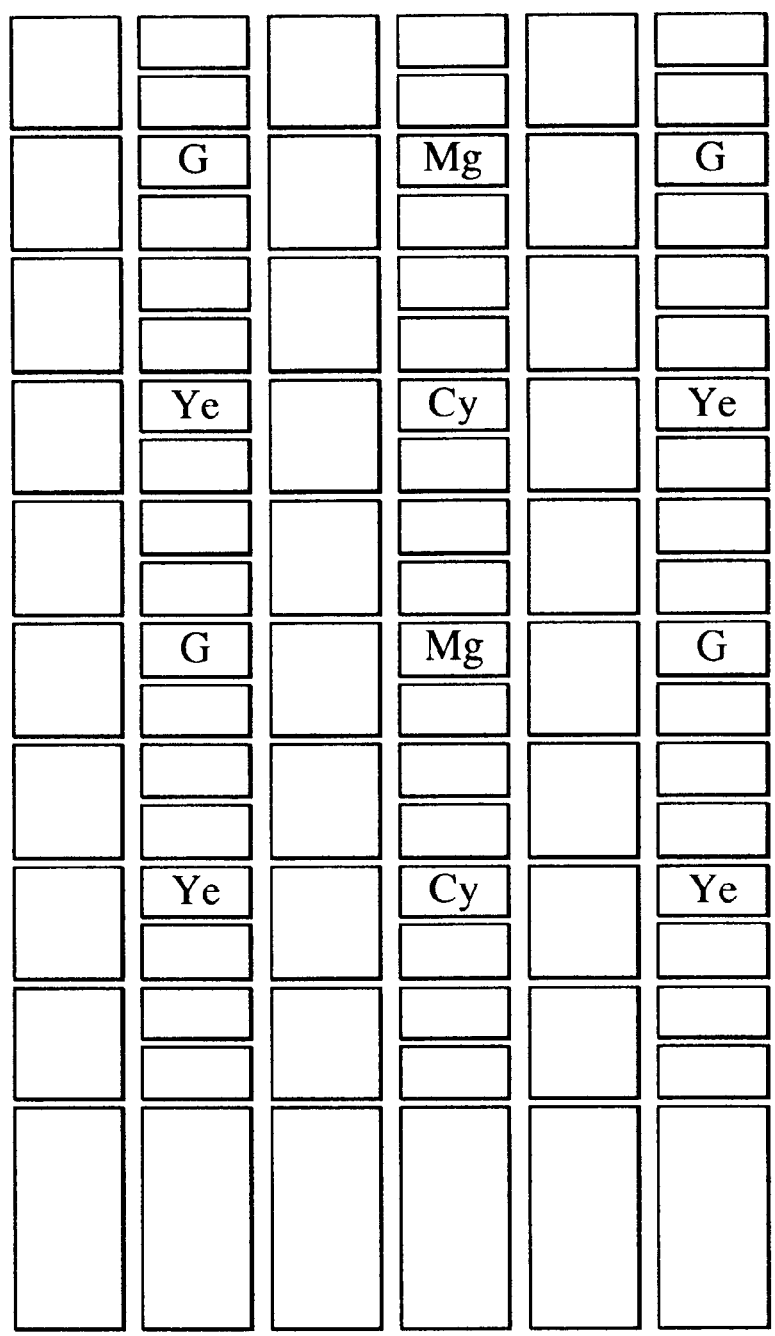

A transfer pulse is then applied to the horizontal charge transfer unit 3 so as to output the added signal charges. FIG. 38 illustrates the state after the completion of the output of the added signal charges. If the signal output in the above process is denoted by S'(even), S'(even) is a sequence of 2×(Cy+Mg) and 2×(Ye+G) appearing periodically in this order. In the above process, S'(odd) and S'(even) are both obtained in the form of a color difference line-sequential signal. In the above process, the one-pixel horizontal transfer shown in FIG. 37 is performed so as to adjust the timing between S'(odd) and S'(even). Furthermore, the process described above with reference to FIGS. 23–36 is performed repeatedly so that pixel signals are read from particular two lines of every four lines and the pixel signals are output after adding together the pixel signals of every two pixel groups of two lines into a pixel signal of one line. The addition of pixel signals of two lines is performed alternately for diagonally adjacent four pixels and for vertically adjacent four pixels so that S(odd) and S(even) are alternately output into the form of a color difference line-sequential signal. This allows the output signal to be subjected to color signal processing required in a video camera or the like.

As can be understood from the above description, in the solid state image pickup apparatus employing the combination of the solid state image sensing device 7 and the image display device 10 having a smaller number of pixels in the vertical direction compared with the number of pixels that can be output in the vertical direction by the solid state image sensing device 7 in each image sensing operation, it is possible to read pixel signals from the solid state image sensing device 7 while skipping particular lines. Furthermore, the image pickup apparatus according to the present embodiment includes the color filter array which is disposed such that a color video signal can be obtained from the signal read from pixels along a reduced number of lines. Furthermore, it is possible to display an image at a speed in accordance with the displaying speed of the image display device 10 without having to employ an image memory 12 shown in FIG. 2 or a special vertical signal reduction means.

In the present embodiment, since signals are added together among four pixels in the diagonal direction and also in the vertical direction, it is possible to obtain an image signal having a signal level twice higher than can be obtained in the first embodiment. This makes it possible to obtain a high-quality image even when the image is taken under the dark condition. Although the addition is performed among four pixels in the specific example described above, addition may also be performed among 6 or more pixels.

Furthermore, in addition to the operation described above, if a reading pulse is further applied to V7 and V5 of the vertical transfer electrodes in FIGS. 21 and 23 so that the signal charges on the (4 m+1)th and (4 m+2)th lines are read into the vertical transfer electrodes V7 and V5, respectively, and these signal charges are output after performing the addition process, then it becomes possible to also accommodate an image display device capable of displaying an image in an interlaced fashion.

Third Embodiment

A third embodiment is described below with reference to FIGS. 4, 6–19, 39, and 40. The structure and the operation shown in FIGS. 4 and 19 are similar to those in the first embodiment and thus they are not described in further detail herein.

Figure 39:
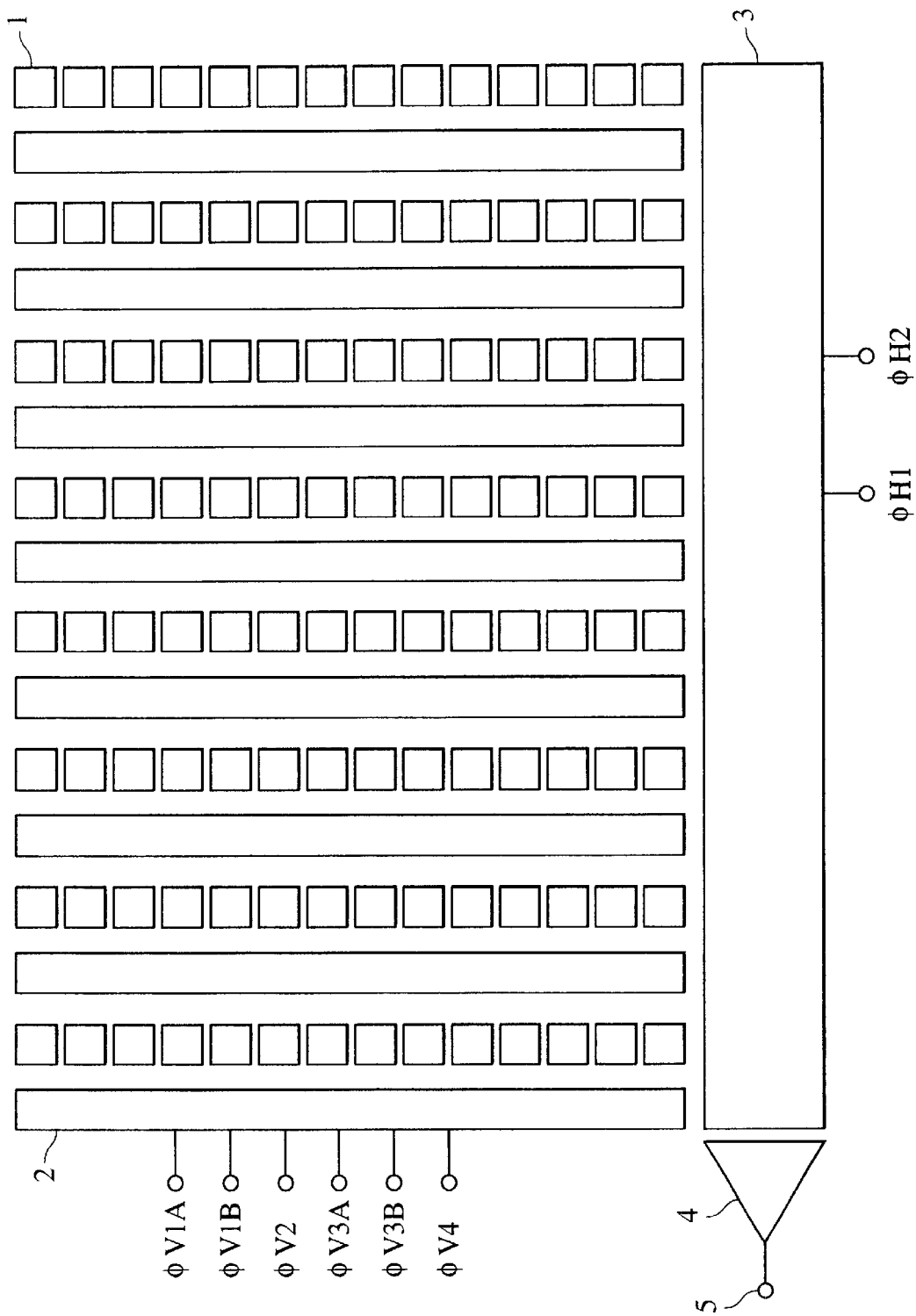
FIG. 39 is a schematic diagram illustrating the general structure of an interline type solid state image sensing device according to the third embodiment of the invention.

FIG. 39 is a schematic diagram illustrating the general structure of an interline type solid state image sensing device according to the third embodiment of the invention reference numeral 1 denotes a pixel, 2 denotes a vertical charge transfer unit, 3 denotes a horizontal charge transfer unit, 4 denotes an output unit, and Signal charges produced by the respective pixels by means of photoelectric conversion are transferred to the vertical charge transfer unit 2 in synchronization with reading pulses. In this embodiment, the vertical charge transfer unit 2 includes two electrodes for each pixel and thus four electrodes for every two pixels so that pixels are driven by four-phase pulses. Electrodes to which first- and third-phase driving pulses are applied are disposed alternately as V1A and V1B, and V3A and V3B so that driving pulses are applied separately to these electrodes. Signal charges read into to the vertical charge transfer unit 2 are sequentially transferred toward the horizontal charge transfer unit 3 in synchronization with four-phase driving pulses φV1A, φV1B, φV2, φV3A, φV-3B, and φV4 applied to electrodes V1A, V1B, V2, V3A, V3B, and V4, respectively.

The horizontal charge transfer unit 3 transfers the one-line signal charges received from the vertical charge transfer unit 2 to the output unit 4 in synchronization with two-phase driving pulses φH1 and φH2 applied to the electrodes H1 and H2. The output unit creates a voltage signal according to the signal charges and outputs the resultant voltage signal via the signal output terminal 5. Furthermore, pulses are applied to electrodes V1A, V1B, V3A, and V3B serving as vertical charge transfer electrodes and also as reading electrodes so that the signal charges are read from particular two lines of every four lines.

Figure 40:
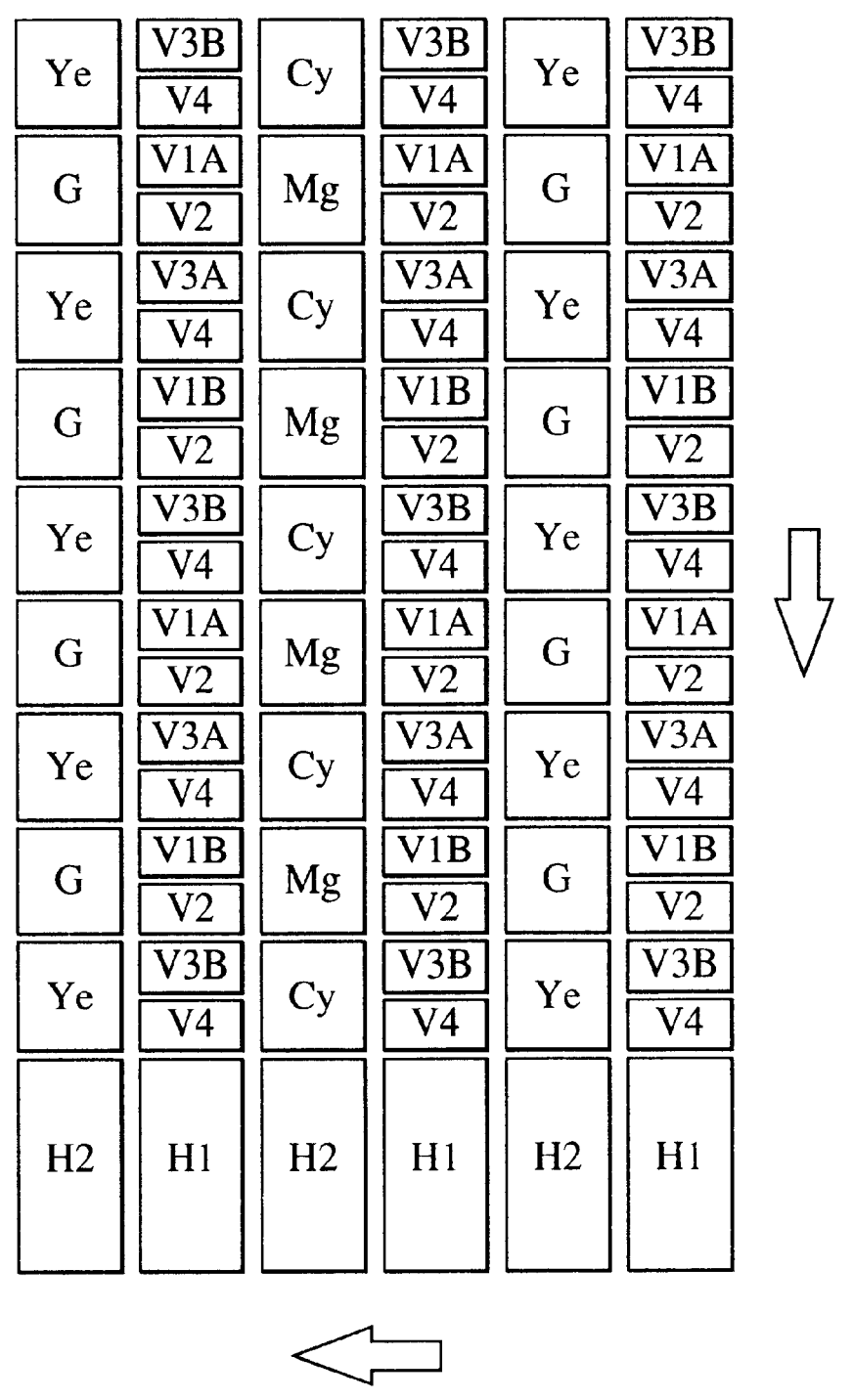

FIG. 40 is a schematic diagram illustrating the solid state image sensing device according to the present embodiment wherein the respective pixels 1 are covered with elements of the color filter array shown in FIG. 4.

The vertical charge transfer unit 2 includes transfer electrodes denoted by V1A, V1B, V2, V3A, V3B, and V4 to which four-phase driving pulses φV1A, φV1B, φV2, φV3A, φV3B, and φV4 are applied respectively. The horizontal charge transfer unit 3 includes transfer electrodes denoted by H1 and H2 to which two-phase driving pulses φH1 and φH2 are applied respectively. The vertical charge transfer unit 2 transfers signal charges in a downward direction in FIG. 5 and horizontal charge transfer unit 3 transfers signal charges in a horizontal direction in FIG. 5.

The operation according to the present embodiment is described below with reference to FIGS. 6–18. FIGS. 6–18 illustrate the operation of reading the signal charges accumulated in the respective pixels 1 covered with the corresponding color filters. Herein, n is set to 4 so that pixel signals are read from particular two lines of four lines and output after adding the two-line pixel signals into an one-line pixel signal. Color filters, vertical transfer electrodes, and horizontal transfer electrodes are disposed as shown in FIG. 40.

In the present embodiment, the reading operation is performed such that pixel signals are read along the third and fourth lines of every four lines and thus these lines are represented by (4 m+3)th and (4 m+4)th lines where m is an integer equal to or greater than 0.

FIG. 6 illustrates the state in which accumulated signal charges are stored in the respective pixels 1 having their own color filter. First, as shown in FIG. 5 a reading pulse is applied to V3A of the vertical transfer electrodes so that Ye and Cy signal charges on the (4 m+3)th lines are read into the corresponding vertical transfer electrodes V3A and transferred to the vertical transfer electrodes V1B as shown in FIG. 8. Then, as shown in FIG. 9, a reading pulse is applied to V1A of the vertical transfer electrodes so that G and Mg signal charges on the (4 m+4)th lines are read into the corresponding vertical transfer electrodes V1A. After that, signal charges on the (4 m+1)th and (4 m+2)th lines which were not read out in the above process are swept out as shown in FIG. 10. The sweeping may be performed for example into a substrate. Upon completion of the sweeping operation, the pixels 1 start to accumulate signal charges via photoelectric conversion although the detailed description is not given here.

Then, as shown in FIG. 11, the signal charges are transferred in the vertical direction by an amount corresponding to two pixels or four electrodes thereby transferring the Ye and Cy signal charges to the horizontal charge transfer unit 3. The signal charges are then transferred in the horizontal direction by an amount corresponding to one pixel so that the signal charges are now located in the order Cy and Ye as shown in FIG. 12.

After that, as shown in FIG. 13, the signal charges are transferred by an amount corresponding to two pixels or four electrodes in the vertical direction thereby transferring the G and Mg signal charges to the horizontal charge transfer unit 3. As a result, Cy and G signal charges are added together and Ye and Mg signal charges are added together. Thus, signal charges of two pixels at diagonally adjacent locations are added together. A transfer pulse is then applied to the horizontal charge transfer unit 3 so as to output the added signal charges. FIG. 14 illustrates the state after the completion of the output of the added signal charges. If the signal output in the above process is denoted by S(odd), S(odd) is a sequence of (Cy+G) and (Ye+Mg) appearing periodically in this order.

After that, as shown in FIG. 15, the signal charges are transferred in the vertical direction by an amount corresponding to two pixels or four electrodes so that Ye and Cy signal charges are transferred to the horizontal charge transfer unit 3. Furthermore, as shown in FIG. 16, the signal charges are transferred in the vertical direction by an amount corresponding to 2 pixels or four electrodes so as to transfer the G and Mg signal charges to the horizontal charge transfer unit 3. As a result, Ye and G signal charges are added together and Cy and Mg signal charges are added together. Thus, signal charges of two pixels at vertically adjacent locations are added together.

The signal charges are then transferred in the horizontal direction by an amount corresponding to one pixel so that the signal charges are now located in the order (Cy+Mg) and (Ye+G) as shown in FIG. 17. A transfer pulse is then applied to the horizontal charge transfer unit 3 so as to output the added signal charges. FIG. 18 illustrates the state after the completion of the output of the added signal charges. If the signal output in the above process is denoted by S(odd), S(odd) is a sequence of (Cy+Mg) and (Ye+G) appearing periodically in this order. In the above process, S(odd) and S(even) are both obtained in the form of a color difference line-sequential signal. In the above process, the one-pixel horizontal transfer shown in FIG. 17 is performed so as to adjust the timing between S(odd) and S(even).

Furthermore, the process described above with reference to FIGS. 11–18 is performed periodically so that pixel signals are read from particular two lines of every four lines and are output after adding the pixel signals of two lines into a pixel signal of one line. The addition of pixel signals of two lines is performed alternately for diagonally adjacent two pixels and for vertically adjacent two pixels so that S(odd) and S(even) are alternately output into the form of a color difference line-sequential signal. This allows the output signal to be subjected to color signal processing required in a video camera or the like.

As can be understood from the above description, in the solid state image pickup apparatus employing the combination of the solid state image sensing device 7 and the image display device 10 having a smaller number of pixels in the vertical direction compared with the number of pixels that can be output in the vertical direction by the solid state image sensing device 7 in each image sensing operation, it is possible to read pixel signals from the solid state image sensing device 7 while skipping particular lines. Furthermore, the image pickup apparatus according to the present embodiment includes the color filter array which is disposed such that a color video signal can be obtained from the signal read from pixels along a reduced number of lines. Furthermore, it is possible to display an image at a speed in accordance with the displaying speed of the image display device 10 without having to employ an image memory 12 shown in FIG. 40 or a special vertical signal reduction means.

In the solid state image sensing device 7 according to the present embodiment, the vertical charge transfer unit 2 is driven by four-phase driving pulses, and signal charges generated by the respective pixels 1 via photoelectric conversion are read into the vertical charge transfer unit 2 in synchronization with four-phase pulses applied to four electrodes V1A, V1B, V3A, and V3B. That is, the solid state image sensing device 7 according to the present embodiment is constructed into the four-phase and six-electrode form, and thus the solid state image sensing device 7 can also be used in applications in which a reduction in the number of electrodes is required.

Furthermore, in addition to the operation described above, if a reading pulse is further applied to V3B and V1B of the vertical transfer electrodes in FIGS. 7 and 9 so that the signal charges on the (4 m+1)th and (4 m+2)th lines are read into the vertical transfer electrodes V3B and V1B, respectively, and these signal charges are output after performing the addition process, then it becomes possible to also accommodate an image display device capable of displaying an image in an interlaced fashion.

Fourth Embodiment

A fourth embodiment is described below with reference to FIGS. 4, 19, and 20–40. The structure and the operation shown in FIGS. 4, 19, and 39 are similar to those in the first embodiment and thus they are not described in further detail herein.

The operation according to the present embodiment is described below with reference to FIGS. 20–38.

FIGS. 20–38 illustrate the operation of reading the signal charges accumulated in the respective pixels 1 covered with the corresponding color filters. In this specific example, n is set to 4 and pixel signals are read for particular two lines of every four lines and the pixel signals are output after adding together the pixel signals of every two pixel groups of two lines into a pixel signal of one line. Color filters, vertical transfer electrodes, and horizontal transfer electrodes are disposed as shown in FIG. 40.

In the present embodiment, the reading operation is performed such that pixel signals are read along the third and fourth lines of every four lines and thus these lines are represented by (4 m+3)th and (4 m+4)th lines where m is an integer equal to or greater than 0.

FIG. 20 illustrates the state in which accumulated signal charges are stored in the respective pixels 1 having their own color filter. First, as shown in FIG. 21, a reading pulse is applied to V3A of the vertical transfer electrodes so that Ye and Cy signal charges on the (4 m+3)th lines are read into the corresponding vertical transfer electrodes V3A and transferred to the vertical transfer electrode V1B as shown in FIG. 22.

Then, as shown in FIG. 23, a reading pulse is applied to V1A of the vertical transfer electrodes so that G and Mg signal charges on the (4 m+4)th lines are read into the corresponding vertical transfer electrodes V1A. After that, signal charges on the (4 m+1)th and (4 m+2)th lines which were not read out in the above process are swept out as shown in FIG. 24. The sweeping may be performed for example into a substrate. Upon completion of the sweeping operation, the pixels 1 start to accumulate signal charges via photoelectric conversion although the detailed description is not given here.

Then, as shown in FIG. 25, the signal charges are transferred in the vertical direction by an amount corresponding to two pixels or four electrodes thereby transferring the Ye and Cy signal charges to the horizontal charge transfer unit 3. The signal charges are then transferred in the horizontal direction by an amount corresponding to one pixel so that the signal charges are now located in the order Cy and Ye as shown in FIG. 26.

After that, as shown in FIG. 27, the signal charges are transferred by an amount corresponding to two pixels or four electrodes in the vertical direction thereby transferring the G and Mg signal charges to the horizontal charge transfer unit 3. As a result, Cy and G signal charges are added together and Ye and Mg signal charges are added together. Thus, signal charges of two pixels at diagonally adjacent locations are added together.

The signal charges are then transferred in the horizontal direction by an amount corresponding to one pixel so that the signal charges are now located in the order (Ye+Mg) and (Cy+G) as shown in FIG. 28. Furthermore, as shown in FIG. 29, the signal charges are transferred in the vertical direction by an amount corresponding to two pixels or four electrodes so that the Ye and Cy signal charges are transferred to the horizontal charge transfer unit 3. As a result, (Ye+Mg) and Ye are added together, and (Cy+G) and Cy are added together. Thus, signal charges of three pixels at diagonally adjacent locations are added together.

The signal charges are then transferred in the horizontal direction by an amount corresponding to one pixel so that the signal charges are now located in the order (Cy+G+Cy) and (Ye+Mg+Ye) as shown in FIG. 30. After that, as shown in FIG. 31, the signal charges are transferred in the vertical direction by an amount corresponding to two pixels or four electrodes so as to transfer the G and Mg signal charges to the horizontal charge transfer unit 3. As a result, (Cy+G+Cy) and G are added together and (Ye+Mg+Ye) and Mg are added together. Thus, signal charges of four pixels at diagonally adjacent locations are added together.

A transfer pulse is then applied to the horizontal charge transfer unit 3 so as to output the added signal charges. FIG.

32 illustrates the state after the completion of the output of the added signal charges. If the signal output in the above process is denoted by S'(odd), S'(odd) is a sequence of 2×(Cy+G) and 2×(Ye+Mg) appearing periodically in this order.

The above-described operation is performed periodically so as to transfer signal charges in the vertical direction by an amount corresponding to two pixels or four electrodes and add together Ye, G, Ye, and G, and add together Cy, Mg, Cy, and Mg, as shown in FIGS. 33, 34, 35, and 36 Thus, signal charges of four pixels at vertically adjacent locations are added together.

The signal charges are then transferred in the horizontal direction by an amount corresponding to one pixel so that the signal charges are now located in the order (Cy+Mg+Cy+Mg) and (Ye+G+Ye+G) as shown in FIG. 37. A transfer pulse is then applied to the horizontal charge transfer unit 3 so as to output the added signal charges. FIG. 38 illustrates the state after the completion of the output of the added signal charges. If the signal output in the above process is denoted by S'(even), S'(even) is a sequence of 2×(Cy+Mg) and 2×(Ye+G) appearing periodically in this order. In the above process, S'(odd) and S'(even) are both obtained in the form of a color difference line-sequential signal. In the above process, the one-pixel horizontal transfer shown in FIG. 37 is performed so as to adjust the timing between S'(odd) and S'(even).

Furthermore, the process described above with reference to FIGS. 25–38 is performed repeatedly so that pixel signals are read from particular two lines of every four lines and the pixel signals are output after adding the pixel signals of two lines into a pixel signal of one line. The addition of pixel signals of two lines is performed alternately for diagonally adjacent four pixels and for vertically adjacent four pixels so that S'(odd) and S'(even) are alternately output into the form of a color difference line-sequential signal. This allows the output signal to be subjected to color signal processing required in a video camera or the like.

in the solid state image pickup apparatus employing the combination of the solid state image sensing device 7 and the image display device 10 having a smaller number of pixels in the vertical direction compared with the number of pixels that can be output in the vertical direction by the solid state image sensing device 7 in each image sensing operation, the process of reading pixel signals from the solid state image sensing device 7 can be performed in such a manner that particular lines are skipped. Furthermore, the image pickup apparatus according to the present embodiment includes the color filter array which is disposed such that a color image signal can be obtained from the signal read from pixels along a reduced number of lines. Furthermore, it is possible to display an image at a speed in accordance with the displaying speed of the image display device 10 without having to employ an image memory 12 shown in FIG. 2 or a special vertical signal reduction means.

In the present embodiment, since signals are added together among four pixels in the diagonal direction or in the vertical direction, it is possible to obtain an image signal having a signal level twice higher than can be obtained in the third embodiment. This makes it possible to obtain a high-quality image even when the image is taken under the dark condition. Although the addition is performed among four pixels in the specific example described above, addition may also be performed among 6 or more pixels.

In the solid state image sensing device 7 according to the present embodiment, the vertical charge transfer unit 2 is driven by four-phase driving pulses, and signal charges generated by the respective pixels 1 via photoelectric conversion are read into the vertical charge transfer unit 2 in synchronization with four-phase pulses applied to four electrodes V1A, V1B, V3A, and V3B. That is, the solid state image sensing device 7 according to the present embodiment is constructed into the four-phase and six-electrode form, and thus the solid state image sensing device 7 can also be used in applications in which a reduction in the number of electrodes is required.

Furthermore, in addition to the operation described above, if a reading pulse is further applied to V3B and V1B of the vertical transfer electrodes in FIGS. 21 and 23 so that the signal charges on the (4 m+1)th and (4 m+2)th lines are read into the vertical transfer electrodes V3B and V1B, respectively, and these signal charges are output after performing the addition process, then it becomes possible to also accommodate an image display device capable of displaying an image in an interlaced fashion.

According to any of the first to fourth embodiments, as described above, there is provided a solid state image pickup apparatus employing a combination of a solid state image sensing device and an image display device having a smaller number of vertical pixels compared with the number of vertical pixels that can be output in the vertical direction by the solid state image sensing device during one image sensing operation, in which charge signals generated at respective pixels during one image sensing operation are read while skipping particular lines and added together among adjacent pixels. This makes it possible to display an image on an image display device in synchronization with the display speed of the image display device without having to use an image memory or special vertical signal reduction means. Furthermore, it is not necessary to use an image memory or vertical signal reduction means for synchronization between the solid state image sensing device and the image display device. This allows a simplification of the circuit configuration and thus a reduction in the size of the circuit. Thus, it is possible to achieve an apparatus with a reduced size at reduced cost.

Furthermore, since the solid state image sensing device outputs a signal in the form of a color difference line-sequential signal, color signal processing which is required in a video camera or the like can be performed on the output signal.

Still furthermore, in the second and fourth embodiments, charge signals are added together among four or more adjacent pixels thereby ensuring that a high-quality image can be obtained even when the image is taken under the dark condition.

What is claimed is:

1. A method of reading charges in an image pickup apparatus which includes a solid state image sensing device having an array of sensing pixels arranged in horizontal lines, and an array of color filters aligned with the pixels and arranged in groups of four horizontal lines, wherein odd-numbered lines of filters in each group have alternately placed first-and second-color filters, and even-numbered lines have alternately placed third- and fourth-color filters, said method comprising the steps of:

reading charges from pixels in only two adjacent lines in each group of four lines;

adding together the charges read from diagonally adjacent pixels in that group of four lines; and adding together the charges read from vertically adjacent pixels in an alternate group of four lines, wherein the diagonal adding and the vertical adding are performed alternately.

2. A method of reading charges in an image pickup apparatus according to claim 1, wherein said first-, second-, third-, and fourth-color filters are, respectively, yellow, cyan, green, and magenta.

3. A method of reading charges in an image pickup apparatus which includes a solid state image sensing device having an array of sensing pixels arranged in horizontal lines, and an array of color filters aligned with the pixels and arranged in groups of four horizontal lines, wherein odd-numbered lines of filters in each group have alternately placed first- and second-color filters, and even-numbered lines have alternately placed third- and fourth-color filters, said method comprising the steps of:

reading charges from pixels in only two adjacent lines in each group of four lines;

adding together the charges read from diagonally adjacent pixels in a set of two successive groups of four lines; and adding together the charges read from vertically adjacent pixels in an alternate set of two successive groups of four lines, wherein the diagonal adding and the vertical adding are performed alternately.

4. A method of reading charges in an image pickup apparatus according to claim 3, wherein said first-, second-, third-, and fourth-color filters are, respectively, yellow, cyan, green, and magenta.

5. An image pickup apparatus which includes a solid state image sensing device having an array of sensing pixels arranged in horizontal lines, said apparatus comprising:

an array of color filters aligned with said pixels and arranged in groups of four horizontal lines, wherein odd-numbered lines of filters in each said group have alternately placed first- and second-color filters, and even-numbered lines have alternately placed third- and fourth-color filters;

a reading unit for reading charges from pixels in only two adjacent lines in each said group of four lines; and an adding unit for adding together the charges read from diagonally adjacent pixels in a said group of four lines, and for adding together the charges read from vertically adjacent pixels in an alternate group of four lines, wherein the adding unit alternately performs the diagonal adding and the vertical adding.

6. An image pickup apparatus according to claim 5, wherein said first-, second-, third-, and fourth-color filters are, respectively, yellow, cyan, green, and magenta.

7. An image pickup apparatus which includes a solid state image sensing device having an array of sensing pixels arranged in horizontal lines, said apparatus comprising:

an array of color filters aligned with said pixels and arranged in groups of four horizontal lines, wherein odd-numbered lines of filters in each said group have alternately placed first- and second-color filters, and even-numbered lines have alternately placed third- and fourth-color filters;

a reading unit for reading charges from pixels in only two adjacent lines in each said group of four lines; and an adding unit for adding together the charges read from diagonally adjacent pixels in a set of two successive groups of four lines, and for adding together the charges read from vertically adjacent pixels in an alternate set of two successive groups of four lines, wherein the adding unit alternately performs the diagonal adding and the vertical adding.

8. A method of reading charges in an image pickup apparatus according to claim 7, wherein said first-, second-, third-, and fourth-color filters are, respectively, yellow, cyan, green, and magenta.

\* \* \* \* \*

UNITED STATES PATENT AND TRADEMARK OFFICE
CERTIFICATE OF CORRECTION

PATENT NO. : 6,760,069 B2
DATED : July 6, 2004
INVENTOR(S) : Toshikazu Yanai

It is certified that error appears in the above-identified patent and that said Letters Patent is hereby corrected as shown below:

<u>Title page,</u>
Item [*] Notice, insert:
-- This patent issued on a continued prosecution application filed under 37 CFR 1.53(d), and is subject to the twenty year patent term provisions of 35 U.S.C. 154(A)(2). --.

Signed and Sealed this

Thirtieth Day of November, 2004

JON W. DUDAS
*Director of the United States Patent and Trademark Office*